US012532098B2

(12) United States Patent
Lee et al.

(10) Patent No.: US 12,532,098 B2
(45) Date of Patent: *Jan. 20, 2026

(54) VIBRATION-GENERATING APPARATUS AND VEHICLE INCLUDING THE SAME

(71) Applicant: LG Display Co., Ltd., Seoul (KR)

(72) Inventors: Sungtae Lee, Paju-si (KR); KwanHo Park, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 63 days.

This patent is subject to a terminal disclaimer.

(21) Appl. No.: 18/614,104

(22) Filed: Mar. 22, 2024

(65) Prior Publication Data

US 2024/0267661 A1 Aug. 8, 2024

Related U.S. Application Data

(63) Continuation of application No. 17/560,876, filed on Dec. 23, 2021, now Pat. No. 12,003,906.

(30) Foreign Application Priority Data

Dec. 29, 2020 (KR) ........................ 10-2020-0186074

(51) Int. Cl.

*H04R 1/02* (2006.01)
*G10K 11/178* (2006.01)
*H04R 17/00* (2006.01)

(52) U.S. Cl.

CPC ........... *H04R 1/025* (2013.01); *G10K 11/178* (2013.01); *H04R 17/00* (2013.01); *H04R 2499/13* (2013.01)

(58) Field of Classification Search

CPC .... H04R 1/025; H04R 17/00; H04R 2499/13; G10K 11/178; G10K 2210/128; G10K 2210/1282

See application file for complete search history.

(56) References Cited

U.S. PATENT DOCUMENTS 5,684,884 A * 11/1997 Nakaya .................. H04R 17/00 310/322
2004/0101154 A1* 5/2004 Maekawa ............ H04R 1/1091 381/380

(Continued)

FOREIGN PATENT DOCUMENTS

CN 101304621 A 11/2008
CN 103434424 A 12/2013

(Continued)

OTHER PUBLICATIONS

Office Action dated Jan. 2, 2025 issued in corresponding Korean Patent Application No. 10-2020-0186074.

(Continued)

*Primary Examiner* — Jason R Kurr

(74) *Attorney, Agent, or Firm* — Morgan, Lewis & Bockius LLP

(57) ABSTRACT

A vibration generating apparatus may include: a microphone apparatus disposed at an object including a plurality of regions, the microphone apparatus being configured to receive noise near the object; a sound processing circuit configured to receive a sound source signal and a noise signal corresponding to the noise, generate a noise removal signal having an antiphase of the noise signal, and generate a vibration driving signal based on the sound source signal and the noise removal signal; and a vibration apparatus disposed at the object to vibrate based on the vibration driving signal to vibrate the object. The noise may be offset and removed by a vibration of the vibration apparatus generated based on the noise removal signal, and a sound source generated by a vibration of the vibration apparatus based on the sound source signal may be received by a user through bone conduction.

33 Claims, 14 Drawing Sheets

(56) References Cited

U.S. PATENT DOCUMENTS

| | | | |
|---|---|---|---|
| 2005/0023937 A1 | 2/2005 | Sashida et al. | |
| 2008/0260174 A1 | 10/2008 | Yokota | |
| 2012/0300956 A1 | 11/2012 | Horii | |
| 2013/0049876 A1 | 2/2013 | Onishi et al. | |
| 2013/0142348 A1 | 6/2013 | Weisman | |
| 2013/0243225 A1 | 9/2013 | Yokota | |
| 2015/0131838 A1* | 5/2015 | Horii ................ | G10K 11/17837 381/381 |
| 2018/0151169 A1 | 5/2018 | Kim et al. | |
| 2018/0316995 A1 | 11/2018 | Miyoshi | |
| 2020/0209973 A1 | 7/2020 | Kim et al. | |
| 2020/0314515 A1 | 10/2020 | Jang et al. | |
| 2020/0314556 A1 | 10/2020 | Lee et al. | |
| 2020/0319842 A1 | 10/2020 | Lee et al. | |
| 2020/0322713 A1 | 10/2020 | Tomoi | |
| 2021/0020156 A1 | 1/2021 | Tachi et al. | |
| 2021/0166675 A1 | 6/2021 | Soltner et al. | |
| 2022/0210530 A1 | 6/2022 | Lee et al. | |

FOREIGN PATENT DOCUMENTS

| | | | |
|---|---|---|---|
| CN | 111381724 | A | 7/2020 |
| CN | 111755592 | A | 10/2020 |
| CN | 111757220 | A | 10/2020 |
| JP | 2005-045691 | A | 2/2005 |
| JP | 2007-208949 | A | 8/2007 |
| JP | 2010-045574 | A | 2/2010 |
| JP | 7320592 | B2 | 8/2023 |
| KR | 10-2008-0094601 | A | 10/2008 |
| KR | 10-2020-0021392 | A | 2/2020 |
| TW | 202038632 | A | 10/2020 |
| WO | 2017/126257 | A1 | 7/2017 |
| WO | 2019/038915 | A1 | 2/2019 |

OTHER PUBLICATIONS

Office Action dated Mar. 1, 2025 issued in corresponding Chinese Patent Application No. 202111588909.X.

Extended European Search Report issued by the European Patent Office dated May 18, 2022 in counterpart European Patent Application No. 21217077.3.

Office Action issued by the Taiwanese Patent Office dated Sep. 5, 2022 in counterpart Taiwanese Patent Application No. 110148516.

Office Action dated Nov. 25, 2022, issued in counterpart Japanese Patent Application No. 2021-210162.

Office Action issued Apr. 2, 2024 for European Patent Application No. 21217077.3.

Office Action dated Sep. 17, 2024 issued in corresponding Japanese Patent Application No. 2023-119594.

Office Action dated Jul. 16, 2025 issued in corresponding Chinese Patent Application No. 202111588909.X.

* cited by examiner

VIBRATION-GENERATING APPARATUS AND VEHICLE INCLUDING THE SAME

CROSS-REFERENCE TO RELATED APPLICATION(S)

This application is a continuation of co-pending U.S. patent application Ser. No. 17/560,876, filed on Dec. 23, 2021, which claims the benefit of and priority to Korean Patent Application No. 10-2020-0186074, filed on Dec. 29, 2020. The entirety of each of the above prior U.S. and Korean patent applications is hereby incorporated by reference.

BACKGROUND

1. Technical Field

The present disclosure relates to a vibration-generating apparatus and a vehicle including the same.

2. Discussion of the Related Art

A navigation apparatus, a vehicular audio system, a digital multimedia broadcasting (DMB) apparatus, a smartphone of a driver, or various wireless apparatuses are connected to a vehicular speaker of a vehicle, and transfers, as sounds, various information to a passenger through the vehicular speaker. To this end, a vehicular multimedia apparatus outputs, through the speaker equipped in the vehicle, all sounds input from the navigation device, the vehicular audio system, the smartphone, or the microphone to provide information to all passengers of the vehicle.

All sound information is output through a vehicular speaker. Thus, when a driver is performing a call through a multimedia apparatus, a passenger may listen to a call conversation to which only the driver should listen, causing the exposure of privacy of the driver. Also, when the driver does not accurately recognize voice guidance due to in-vehicle noise, a traffic accident may occur.

SUMMARY

Therefore, the inventors have recognized the above-described problems and have performed various experiments for providing sound to a target who desires to listen to the sound or should listen to the sound. Based on the various experiments, the inventors have invented a vibration-generating apparatus having a new structure and a vehicle including the vibration-generating apparatus, which may provide a sound to a target who desires to listen to the sound or should listen to the sound.

Accordingly, the present disclosure is directed to a vibration-generating apparatus and a vehicle including the same that substantially obviate one or more of the issues due to limitations and disadvantages of the related art.

An aspect of the present disclosure is directed to provide a vibration-generating apparatus and a vehicle including the same, which may provide a sound to an object who desires to listen to the sound or should listen to the sound.

Another aspect of the present disclosure is directed to provide a vibration-generating apparatus and a vehicle including the same, which may provide a high-quality sound to a target who desires to listen to the sound or should listen to the sound.

Another aspect of the present disclosure is directed to provide a vibration-generating apparatus and a vehicle including the same, which may provide, through bone conduction, a sound to a target who desires to listen to the sound or should listen to the sound.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, there is provided a vibration-generating apparatus, including: a microphone apparatus disposed at an object including a plurality of regions, the microphone apparatus being configured to receive noise near the object, a sound processing circuit configured to: receive a sound source signal and a noise signal corresponding to the noise, generate a noise removal signal having an antiphase of the noise signal, and generate a vibration driving signal, based on the sound source signal and the noise removal signal, and a vibration apparatus disposed at the object to vibrate based on the vibration driving signal to vibrate the object.

In another aspect, there is provided a vibration-generating apparatus, including: a microphone apparatus disposed at an object including a first region, a second region, a third region, and a fourth region, the microphone apparatus being configured to receive noise near the object, a sound processing circuit configured to: receive a sound source signal and a noise signal corresponding to the noise, generate a noise removal signal having an antiphase of the noise signal, and generate a vibration driving signal, based on the sound source signal and the noise removal signal, and one or more vibration generators configured to vibrate based on the vibration driving signal to vibrate one or more of the third region and the fourth region.

The vibration-generating apparatus and the vehicle including the same according to embodiments of the present disclosure may provide a sound to an target who desires to listen to the sound or should listen to the sound, and may provide a high-quality sound. The vibration-generating apparatus and the vehicle including the same according to embodiments of the present disclosure may provide a sound to a target, who desires to listen to the sound or should listen to the sound, among in-vehicle passengers (e.g., a driver and occupants), thereby protecting privacy. The vibration-generating apparatus and the vehicle including the same according to embodiments of the present disclosure may offset noise occurring with respect to a user, and thus, may enhance a noise reduction effect corresponding to a corresponding user and may provide a high-quality sound.

The vibration-generating apparatus and the vehicle including the same according to embodiments of the present disclosure may provide guidance broadcasting or an alarm through bone conduction, thereby enabling a driver to accurately recognize the guidance broadcasting or the alarm despite in-vehicle noise. The vibration-generating apparatus and the vehicle including the same according to embodiments of the present disclosure may provide a sound through bone conduction, thereby enabling a deaf driver to safely drive a vehicle.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages may be discussed below in conjunction with embodiments of the disclosure. It is to be understood that both the foregoing general description and the following detailed description of the present disclosure may be examples and explanatory, and may be intended to provide further explanation of the disclosure as claimed.

BRIEF DESCRIPTION OF THE DRAWINGS

The accompanying drawings, that may be included to provide a further understanding of the disclosure and may be incorporated in and constitute a part of this disclosure, illustrate embodiments of the disclosure and together with the description serve to explain various principles of the disclosure.

Figure 1:
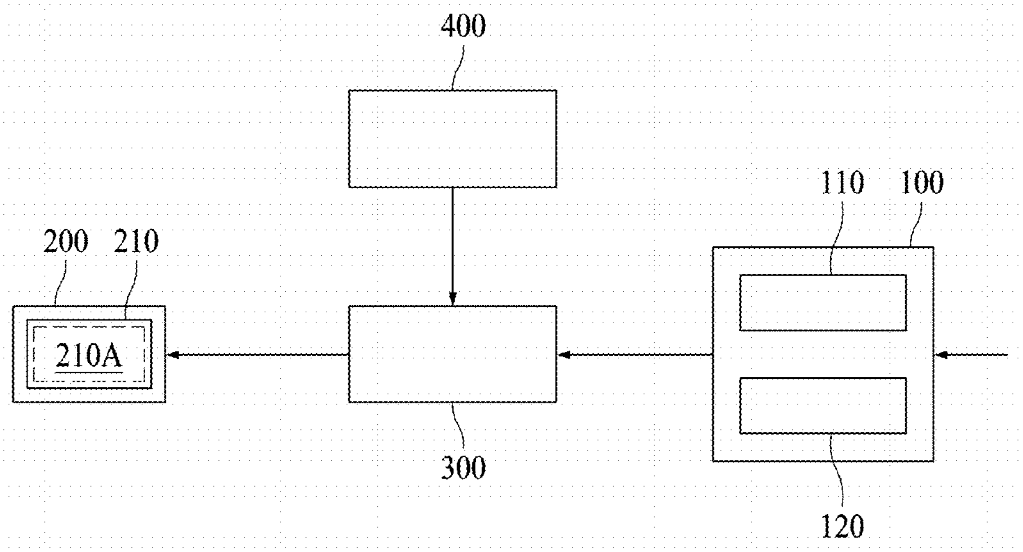
FIG. 1 illustrates a vibration-generating apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

Advantages and features of the present disclosure, and implementation methods thereof will be clarified through following example embodiments described with reference to the accompanying drawings. The present disclosure may, however, be embodied in different forms and should not be construed as limited to the example embodiments set forth herein. Rather, these example embodiments may be provided so that this disclosure may be sufficiently thorough and complete to assist those skilled in the art to fully understand the scope of the present disclosure. Further, the present disclosure is only defined by scopes of claims.

A shape, a size, a ratio, an angle, and a number disclosed in the drawings for describing embodiments of the present disclosure may be merely an example. Thus, the present disclosure is not limited to the illustrated details. Like reference numerals refer to like elements throughout. In the following description, when the detailed description of the relevant known function or configuration is determined to unnecessarily obscure an important point of the present disclosure, the detailed description of such known function or configuration may be omitted. When terms "include," "have," and "include" described in the present disclosure may be used, another part may be added unless a more limiting term, such as "only," is used. The terms of a singular form may include plural forms unless referred to the contrary.

In construing an element, the element is construed as including an error or tolerance range even where no explicit description of such an error or tolerance range. In describing a position relationship, when a position relation between two parts is described as, for example, "on," "over," "under," or "next," one or more other parts may be disposed between the two parts unless a more limiting term, such as "just" or "direct(ly)," is used. In describing a time relationship, when the temporal order is described as, for example, "after," "subsequent," "next," or "before," a case that is not continuous may be included, unless a more limiting term, such as "just," "immediate(ly)," or "direct(ly)," is used.

It will be understood that, although the terms "first," "second," etc. May be used herein to describe various elements, these elements should not be limited by these terms. These terms may be only used to distinguish one element from another. For example, a first element could be termed a second element, and, similarly, a second element could be termed a first element, without departing from the scope of the present disclosure.

In describing elements of the present disclosure, the terms like "first," "second," "A," "B," "(a)," and "(b)" may be used. These terms may be merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned “on or above” or “under or below” another structure, this description should be construed as including a case in which the structures contact each other as well as a case in which a third structure is disposed therebetween. The size and thickness of each element shown in the drawings may be given merely for the convenience of description, and embodiments of the present disclosure may not be limited thereto.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term “may” fully encompasses all the meanings of the term “can.”

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term “part” or “unit” may apply, for example, to a separate circuit or structure, an integrated circuit, a computational block of a circuit device, or any structure configured to perform a described function as should be understood to one of ordinary skill in the art.

Hereinafter, example embodiments of the present disclosure will be described in detail with reference to the accompanying drawings.

FIG. 1 illustrates a vibration-generating apparatus according to an embodiment of the present disclosure.

With reference to FIG. 1, the vibration-generating apparatus according to an embodiment of the present disclosure may include a microphone apparatus 100, a vibration apparatus 200, and a sound processing circuit 300. A configuration of the vibration-generating apparatus is not limited thereto.

For example, the vibration-generating apparatus according to an embodiment of the present disclosure may be applied to seats of vehicles. As another embodiment of the present disclosure, the vibration-generating apparatus may be applied to seats of trains, massage chairs, desk chairs, head protection equipment (for example, military helmets, motorcycle helmets, baseball helmets, etc.), and the like. An object (or a target object) to which the vibration-generating apparatus is applied is not limited thereto. For example, the object may be a vibration object, a vibration member, a vibration plate, or a sound generating plate, or the like.

The microphone apparatus 100 according to an embodiment of the present disclosure may receive noise (or a second sound source) in addition to a sound source (or a first sound source), which is a sound to be provided through the vibration apparatus 200, and noise input to the microphone apparatus 100 may be converted into an electrical signal, and the electrical signal may be provided to the sound processing circuit 300. For example, the microphone apparatus 100 may convert the input noise into the electrical signal corresponding to the noise, and may provide the electrical signal to the sound processing circuit 300.

According to an embodiment of the present disclosure the microphone apparatus 100 may be disposed at an object to receive noise near a user. For example, the microphone apparatus 100 may be disposed near the vibration apparatus 200, and may be disposed in the object to receive noise near the vibration apparatus 200.

According to an embodiment of the present disclosure, the microphone apparatus 100 may be disposed to receive one or more of noise near the left of a user, and noise near the right of the user. For example, the microphone apparatus 100 may be disposed to receive one or more of noise near a left ear of the user and noise near a right ear of the user. For example, the microphone apparatus 100 may be disposed at one or more of a left periphery and a right periphery of the vibration apparatus 200. For example, the microphone apparatus 100 may receive one or more of noise near the left of the vibration apparatus 200, and noise near the right of the vibration apparatus 200.

According to an embodiment of the present disclosure, when the microphone apparatus 100 receives noise near cars of the user, the sound processing circuit 300 may more effectively remove the noise near the cars of the user than when the microphone apparatus 100 receives noise from a position farther away from peripheries of the cars of the user, thereby enhancing a noise reduction effect and providing a high-quality sound to the user.

According to an embodiment of the present disclosure, the microphone apparatus 100 may be disposed in a first region of an object to which the vibration-generating apparatus is applied, and may receive noise near the first region. For example, the first region may be a region near the left ear of the user. For example, the microphone apparatus 100 may receive noise near the left ear of the user. For example, the first region may be a region near the left of the user. For example, the microphone apparatus 100 may receive noise near the left of the user.

According to an embodiment of the present disclosure, the microphone apparatus 100 may be disposed in a second region of the object to which the vibration-generating apparatus is applied, and may receive noise near the second region. For example, the second region may be a region near the right ear of the user. For example, the microphone apparatus 100 may receive noise near the right ear of the user. For example, the second region may be a region near the right of the user. For example, the microphone apparatus 100 may receive noise near the right of the user.

According to an embodiment of the present disclosure, the microphone apparatus 100 may be disposed in the first region and the second region of the object to which the vibration-generating apparatus is applied, and may receive noise near the first and second regions. Accordingly, the microphone apparatus 100 may receive noise near the both cars of the user or noise near the left and the right of the vibration apparatus 200.

According to an embodiment of the present disclosure, the microphone apparatus 100 may include one or more microphones that may receive noise. According to an embodiment of the present disclosure, the microphone apparatus 100 may include a first microphone (or a left microphone) 110 disposed in the first region of the object. For example, the microphone apparatus 100 may include one or a plurality of first microphones 110. For example, the first microphone 110 may receive noise (first noise or left noise)

near the left ear of the user (or near the left of the vibration apparatus 200). For example, the first microphone 110 may convert the first noise into an electrical signal to provide a first noise signal to the sound processing circuit 300.

According to an embodiment of the present disclosure, the microphone apparatus 100 may include a second microphone (or a right microphone) 120 disposed in the second region of the object. For example, the microphone apparatus 100 may include one or a plurality of second microphones 120. For example, the second microphone 120 may receive noise (second noise or right noise) near the right ear of the user (or near the right of the vibration apparatus 200). For example, the second microphone 120 may convert the second noise into an electrical signal to provide a second noise signal to the sound processing circuit 300.

According to an embodiment of the present disclosure, the microphone apparatus 100 may include the first microphone (or the left microphone) 110 disposed in the first region of the object and the second microphone (or the right microphone) 120 disposed in the second region of the object. For example, the microphone apparatus 100 may include the one or the plurality of first microphones 110 and the one or the plurality of second microphones 120. For example, the microphone apparatus 100 may receive, through the first microphone 110, noise near the left ear of the user (or near the left of the vibration apparatus 200), and may receive, through the second microphone 120, noise near the right ear of the user (or near the right of the vibration apparatus 200).

The vibration apparatus 200 according to an embodiment of the present disclosure may vibrate based on a vibration driving signal (or a sound signal) provided from the sound processing circuit 300, and a vibration of the vibration apparatus 200 may vibrate the ear of the user contacting the vibration apparatus 200 to transfer a sound source to the user. The vibration driving signal may correspond to a sound source that is to be provided to the user, and the vibration of the vibration apparatus 200 based on the vibration driving signal may be transferred to cerebrum via ear epidermis, bone near ears (and cranial bone), cochlea, and auditory nerve, and the user may listen to the sound source through bone conduction.

According to an embodiment of the present disclosure, the vibration apparatus 200 may directly contact the cars of the user and may vibrate the ears of the user. For example, at least a portion of the vibration apparatus 200 may be exposed at the outside of the object, and may directly contact the cars of the user. For example, the vibration apparatus 200 may indirectly contact the ears of the user, and may vibrate the ears of the user. For example, the vibration apparatus 200 may vibrate the object where the vibration apparatus 200 is disposed, and a vibration of the object may vibrate the ears of the user contacting the object. For example, a region vibrated by the vibration apparatus 200 is not limited to cars, and may include an ear periphery region that vibrates to transfer a sound source to the user through bone conduction.

Therefore, the vibration-generating apparatus according to an embodiment of the present disclosure may directly transfer a sound source to cochlea of a user through bone conduction, and thus, only a corresponding user may listen to the sound source. In the vibration-generating apparatus according to an embodiment of the present disclosure, another person may not listen to the sound source, and thus, the privacy of the user may be protected. The vibration-generating apparatus according to an embodiment of the present disclosure may directly transfer the sound source to the user through bone conduction, and thus, may be usefully used for a deaf person, and may enable a deaf driver to safely drive a vehicle. The vibration-generating apparatus according to an embodiment of the present disclosure may provide guidance broadcasting or an alarm through bone conduction, thereby enabling a driver to accurately recognize the guidance broadcasting or the alarm despite in-vehicle noise.

Figure 2:
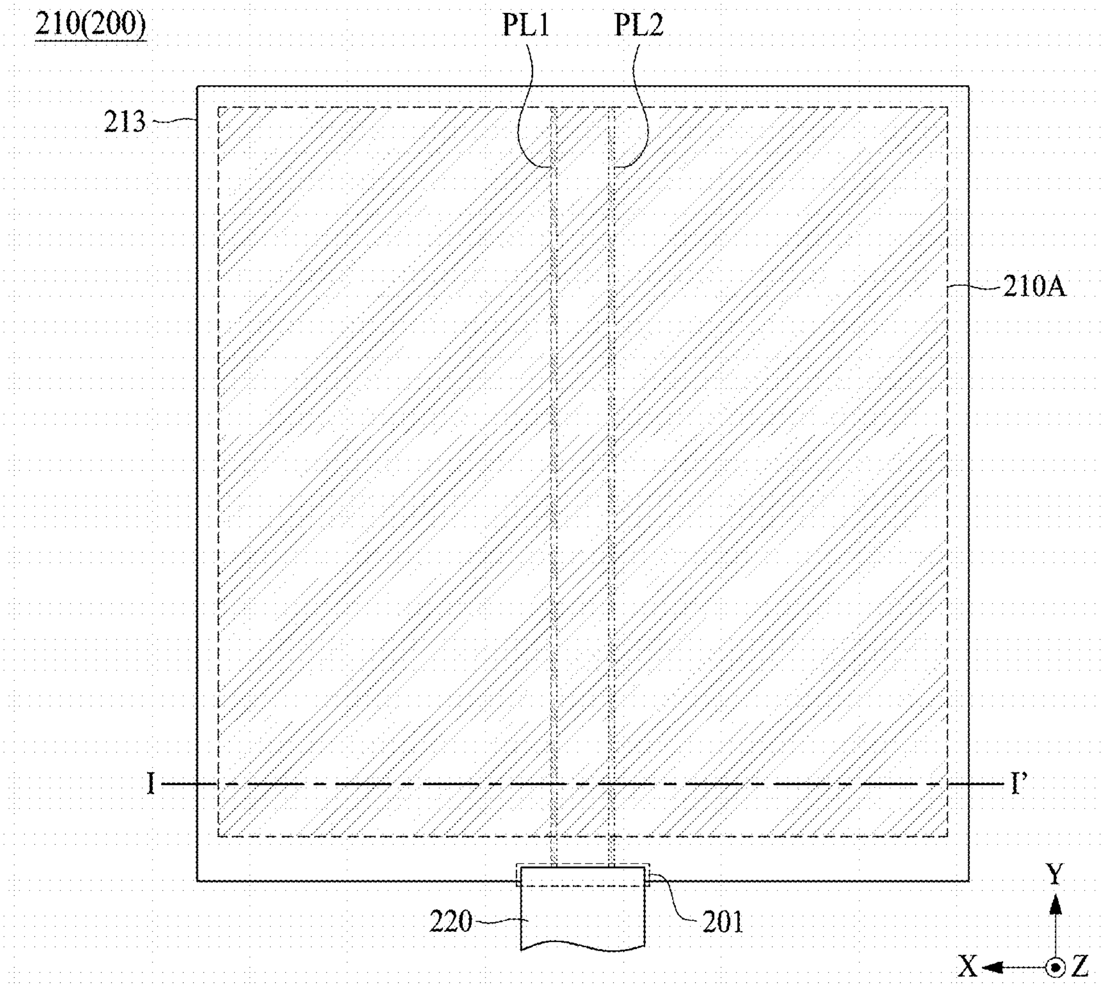
FIG. 2 illustrates a vibration apparatus according to an embodiment of the present disclosure.
Figure 3:
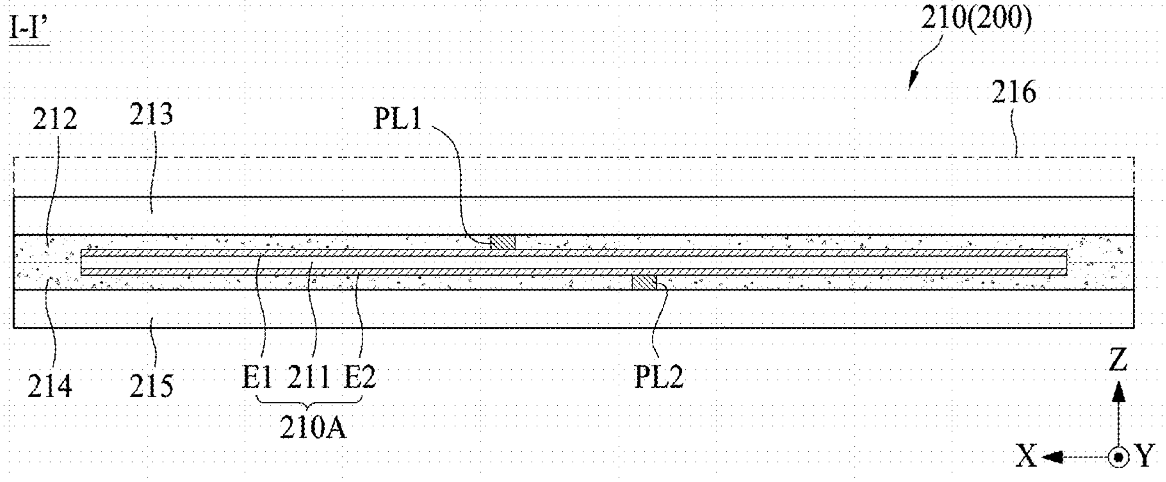
FIG. 3 is a cross-sectional view taken along line I-I' illustrated in FIG. 2.

FIG. 2 illustrates a vibration apparatus according to an embodiment of the present disclosure. FIG. 3 is a cross-sectional view taken along line I-I' illustrated in FIG. 2.

With reference to FIGS. 1 to 3, the vibration apparatus 200 according to an embodiment of the present disclosure may include one or more vibration generators 210. For example, the vibration generator 210 may be disposed at a third region of an object, and may vibrate based on a vibration driving signal. For example, the third region of the object may be a region of the object corresponding to the left ear of the user. For example, the vibration generator 210 may vibrate based on the vibration driving signal to vibrate the left ear of the user. For example, the vibration generator 210 may vibrate the left ear of the user and a region near the left ear of the user.

According to an embodiment of the present disclosure, the vibration generator 210 may be disposed at a fourth region of the object, and may vibrate based on the vibration driving signal. For example, the fourth region of the object may be a region of the object corresponding to the right ear of the user. For example, the vibration generator 210 may vibrate based on the vibration driving signal to vibrate the right ear of the user. For example, the vibration generator 210 may vibrate the right ear of the user and a region near the right ear of the user.

According to an embodiment of the present disclosure, the vibration generator 210 may be disposed at the third region and the fourth region of the object, and may vibrate based on the vibration driving signal. For example, the vibration generator 210 may vibrate based on the vibration driving signal to vibrate the both ears of the user. For example, the vibration generator 210 may vibrate the both cars of the user and regions near the both cars of the user.

According to an embodiment of the present disclosure, the first region, where the first microphone 110 is disposed, of the object may overlap the third region, where the vibration generator 210 is disposed, of the object. For example, the second region, where the second microphone 120 is disposed, of the object may overlap the fourth region, where the vibration generator 210 is disposed, of the object.

According to an embodiment of the present disclosure, the vibration generator 210 according to an embodiment of the present disclosure may include one or more vibration structures. For example, the vibration generator 210 may include one or more vibration structures 210A. For example, the vibration structure 210A may be disposed at the third region of the object, and may vibrate based on the vibration driving signal. For example, the vibration structure 210A may be disposed at the fourth region of the object, and may vibrate based on the vibration driving signal. For example, the vibration structure 210A may be disposed at the third region and the fourth region and may vibrate based on the vibration driving signal.

The vibration structure 210A may alternately and/or repeatedly contract and expand based on a piezoelectric effect (or a piezoelectric characteristic) to vibrate. For example, the vibration structure 210A according to an embodiment of the present disclosure may alternately and/or repeatedly contract and expand based on an inverse piezoelectric effect to vibrate in a thickness direction Z, thereby directly vibrating the target object. For example, the vibration structure 210A according to an embodiment of the present disclosure may have a tetragonal shape or a square shape, but embodiments of the present disclosure are not limited thereto. The vibration structure 210A according to an embodiment of the present disclosure may include a vibration portion 211, a first electrode layer E1, and a second electrode layer E2.

The vibration portion 211 may include a piezoelectric material, a composite piezoelectric material, or an electroactive material. The piezoelectric material, the composite piezoelectric material and the electroactive material may have a piezoelectric effect. The vibration portion 211 may be referred to as a vibration layer, a piezoelectric material layer, a piezoelectric composite layer, an electroactive layer, a piezoelectric material portion, a piezoelectric composite layer, an electroactive portion, a piezoelectric structure, a piezoelectric composite, or a piezoelectric ceramic composite, but embodiments of the present disclosure are not limited thereto.

The vibration portion 211 according to an embodiment of the present disclosure may include a ceramic-based material capable of realizing a relatively high vibration. For example, the vibration portion 211 may include a 1-3 composite structure or a 2-2 composite structure. For example, a piezoelectric deformation coefficient "$d_{33}$" of the vibration portion 211 in a thickness direction Z may have 1,000 pC/N or more, but embodiments of the present disclosure are not limited thereto.

The first electrode layer E1 may be disposed at a first surface (or an upper surface) of the vibration portion 211 and may be electrically connected to the first surface of the vibration portion 211. For example, the first electrode layer E1 may have a single-body electrode type (or a common electrode type) that may be disposed at a whole first surface of the vibration portion 211. The first electrode layer E1 according to an embodiment of the present disclosure may include a transparent conductive material, a semitransparent (or translucent) conductive material, or an opaque conductive material. For example, examples of the transparent conductive material or the semitransparent conductive material may include indium tin oxide (ITO) or indium zinc oxide (IZO), but embodiments of the present disclosure are not limited thereto. The opaque conductive material may include aluminum (Al), copper (Cu), gold (Au), silver (Ag), molybdenum (Mo), magnesium (Mg), or the like, and an alloy of any thereof, but embodiments of the present disclosure are not limited thereto.

The second electrode layer E2 may be at a second surface (or a rear surface) opposite to the first surface of the vibration portion 211, and may be electrically connected to the second surface of the vibration portion 211. For example, the second electrode layer E2 may have a single-body electrode type (or a common electrode type), which may be disposed at a whole second surface of the vibration portion 211. The second electrode layer E2 according to an embodiment of the present disclosure may include a transparent conductive material, a semitransparent conductive material, or an opaque conductive material. For example, the second electrode layer E2 may include the same material as the first electrode layer E1, but embodiments of the present disclosure are not limited thereto. As another embodiment of the present disclosure, the second electrode layer E2 may include a material different from the first electrode layer E1. The vibration portion 211 may be polarized by a certain voltage applied to the first electrode layer E1 and the second electrode layer E2 in a certain temperature atmosphere, or in a temperature atmosphere that may be changed from a high temperature to a room temperature, but embodiments of the present disclosure are not limited thereto.

The vibration generator 210 according to an embodiment of the present disclosure may further include a first protection member 213 and a second protection member 215. The first protection member 213 may be disposed at the first surface of the vibration generator 210. For example, the first protection member 213 may cover the first electrode layer E1 disposed on the first surface of the vibration structure 210A. Thus, the first protection member 213 may support the first surface of the vibration structure 210A, and may protect the first surface of the vibration structure 210A or the first electrode layer E1.

The first protection member 213 according to an embodiment of the present disclosure may be disposed at the first surface of the vibration structure 210A by a first adhesive layer 212. For example, the first protection member 213 may be directly disposed at the first surface of the vibration structure 210A by a film laminating process using the first adhesive layer 212.

The second protection member 215 may be disposed at the second surface of the vibration generator 210. For example, the second protection member 215 may cover the second electrode layer E2 disposed on the second surface of the vibration structure 210A. Thus, the second protection member 215 may support the second surface of the vibration structure 210A, and may protect the second surface of the vibration structure 210A or the second electrode layer E2.

The second protection member 215 may be disposed at the second surface of the vibration structure 210A by a second adhesive layer 214. For example, the second protection member 215 may be directly disposed at the second surface of the vibration structure 210A by a film laminating process using the second adhesive layer 214.

Each of the first protection member 213 and the second protection member 215 according to an embodiment of the present disclosure may include a plastic film. For example, each of the first protection member 213 and the second protection member 215 may be a polyimide (PI) film or a polyethylene terephthalate (PET) film, but embodiments of the present disclosure are not limited thereto.

The first adhesive layer 212 may be disposed at the first surface of the vibration structure 210A. For example, the first adhesive layer 212 may be formed on a rear surface (or an inner surface) of the first protection member 213 facing the first surface of the vibration structure 210A and disposed at the first surface of the vibration structure 210A.

The second adhesive layer 214 may be disposed at the second surface of the vibration structure 210A. For example, the second adhesive layer 214 may be formed on a front surface (or an inner surface) of the second protection member 215 facing the second surface of the vibration structure 210A and disposed at the second surface of the vibration structure 210A.

The vibration structure 210A may be surrounded by the first and second adhesive layers 212 and 214. For example, the first and second adhesive layers 212 and 214 may entirely surround the whole vibration structure 210A. For example, the first and second adhesive layers 212 and 214 may be referred to as a cover member, but embodiments of the present disclosure are not limited thereto. When each of the first and second adhesive layers 212 and 214 is a cover member, the first protection member 213 may be disposed at a first surface of the cover member, and the second protection member 215 may be disposed at a second surface of the cover member. For example, for convenience of description, the first and second adhesive layers 212 and 214 are illustrated as first and second adhesive layers 212 and 214, but embodiments of the present disclosure are not limited thereto, and may be provided as one adhesive layer.

Each of the first and second adhesive layers 212 and 214 according to an embodiment of the present disclosure may include an electric insulating material, which has adhesiveness, and may include a material capable of compression and decompression. For example, each of the first and second adhesive layers 212 and 214 may include an epoxy resin, an acrylic resin, a silicone resin, or a urethane resin, but embodiments of the present disclosure are not limited thereto.

The vibration apparatus 200 or the vibration generator 210 according to an embodiment of the present disclosure may further include a first power supply line PL1, a second power supply line PL2, and a pad part 201. The first power supply line PL1 may be disposed at the first protection member 213. For example, the first power supply line PL1 may be disposed at a rear surface of the first protection member 213 facing the first surface of the vibration structure 210A. The first power supply line PL1 may be electrically connected to the first electrode layer E1 of the vibration structure 210A. For example, the first power supply line PL1 may be directly and electrically connected to the first electrode layer E1 of the vibration structure 210A. For example, the first power supply line PL1 may be electrically connected to the first electrode layer E1 of the vibration structure 210A by an anisotropic conductive film. As another embodiment of the present disclosure, the first power supply line PL1 may be electrically connected to the first electrode layer E1 of the vibration structure 210A by a conductive material (or particle) included in the first adhesive layer 212.

The second power supply line PL2 may be disposed at the second protection member 215. For example, the second power supply line PL2 may be disposed at a front surface of the second protection member 215 facing the second surface of the vibration structure 210A. The second power supply line PL2 may be electrically connected to the second electrode layer E2 of the vibration structure 210A. For example, the second power supply line PL2 may be directly and electrically connected to the second electrode layer E2 of the vibration structure 210A. For example, the second power supply line PL2 may be electrically connected to the second electrode layer E2 of the vibration structure 210A by an anisotropic conductive film. As another embodiment of the present disclosure, the second power supply line PL2 may be electrically connected to the second electrode layer E2 of the vibration structure 210A by a conductive material (or particle) included in the second adhesive layer 214.

The pad part 201 may be electrically connected to the first power supply line PL1 and the second power supply line PL2. For example, the pad part 201 may be disposed at the vibration generator 210 to be electrically connected to one portion (or one end) of each of the first power supply line PL1 and the second power supply line PL2. The pad part 201 according to an embodiment of the present disclosure may include a first pad electrode and a second pad electrode. The first pad electrode may be electrically connected to one portion of the first power supply line PL1. The second pad electrode may be electrically connected to one portion of the second power supply line PL2.

The vibration apparatus 200 or the vibration generator 210 according to an embodiment of the present disclosure may further include a flexible cable 220. The flexible cable 220 may be electrically connected to the pad part 201 disposed in the vibration apparatus 200 or the vibration generator 210, and may supply a vibration driving signal (or a sound signal) provided from a sound processing circuit to the vibration apparatus 200 or the vibration generator 210. The flexible cable 220 according to an embodiment of the present disclosure may include a first terminal and a second terminal. The first terminal may be electrically connected to the first pad electrode of the pad part 201. The second terminal may be electrically connected to the second pad electrode of the pad part 201. For example, the flexible cable 220 may be configured as a flexible printed circuit cable or a flexible flat cable, but embodiments of the present disclosure are not limited thereto.

The vibration generator 210 according to an embodiment of the present disclosure may further include a plate 216. The plate 216 may be disposed at the first protection member 213 or the second protection member 215. For example, the plate 216 may have the same shape as the first protection member 213 (or the second protection member 215). The plate 216 may have a size that is greater than or equal to the first protection member 213 (or the second protection member 215).

The plate 216 according to an embodiment of the present disclosure may be disposed at a front surface (or a first surface) of the first protection member 213. The plate 216 may be disposed at the front surface of the first protection member 213 of the vibration generator 210 by a connection member. The plate 216 according to an embodiment of the present disclosure may be disposed between the object and the first protection member 213.

According to another embodiment of the present disclosure, the plate 216 may be disposed at a rear surface (or a second surface) of the second protection member 215. The plate 216 may be disposed at the rear surface of the second protection member 215 of the vibration generator 210 by a connection member. The plate 216 according to an embodiment of the present disclosure may be disposed between the object and the second protection member 215.

The plate 216 according to an embodiment of the present disclosure may include a metal material, and for example, may include one or more materials among stainless steel, aluminum (Al), a magnesium (Mg), a magnesium (Mg) alloy, a magnesium-lithium (Mg—Li) alloy, and an Al alloy, but embodiments of the present disclosure are not limited thereto. The plate 216 may be disposed at the first protection member 213 (or the second protection member 215) and may reinforce a mass of the vibration generator 210 to decrease a resonance frequency of the vibration generator 210 based on an increase in mass, and thus, may increase a sound characteristic and a sound pressure level characteristic of the low-pitched sound band generated based on a vibration of the vibration generator 210, and may enhance the flatness of a sound characteristic. For example, the flatness of a sound characteristic may be a magnitude of a deviation between a highest sound pressure level and a lowest sound pressure level.

And, the vibration apparatus 200 according to an embodiment of the present disclosure may further include the plate 216 disposed in the vibration generator 210, and thus, a resonance frequency of the vibration generator 210 may be decreased. Accordingly, the vibration apparatus 200 according to an embodiment of the present disclosure may increase a sound characteristic, a sound pressure level characteristic of the low-pitched sound band, and a flatness of a sound characteristic of a sound generated according to a vibration of the object based on a vibration of the vibration generator 210.

FIGS. 4A to 4F illustrate a vibration structure illustrated in FIG. 3.

Figure 4A:
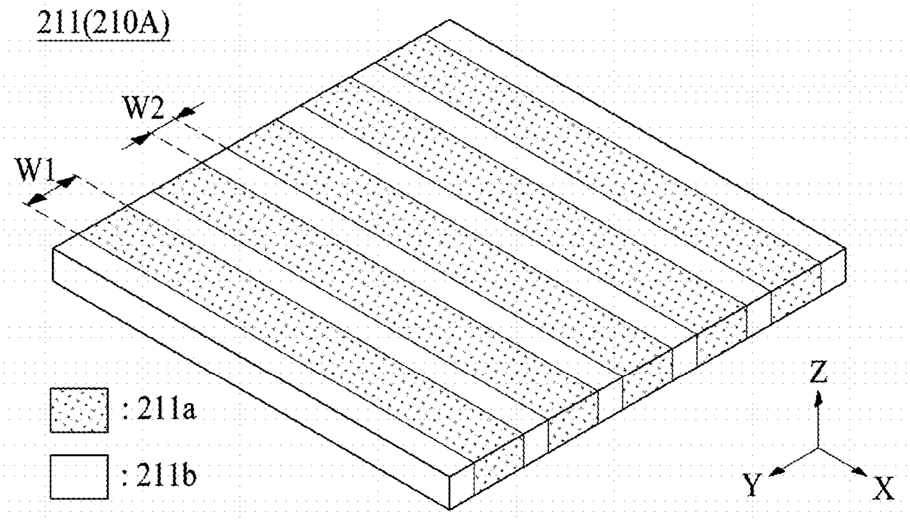
FIGS. 4A to 4F illustrate a vibration structure illustrated in FIG. 3.

With reference to FIGS. 2, 3, and 4A, the vibration structure 210A included in the vibration generator 210 of the vibration apparatus 200 according to an embodiment of the present disclosure may include a vibration portion (or a vibration layer) 211. For example, the vibration apparatus 200 according to an embodiment of the present disclosure may include a vibration structure 210A. For example, the vibration structure 210A may include a first portion 211*a* and a second portion 211*b*. For example, the first portion 211*a* may include an inorganic material, and the second portion 211*b* may include an organic material. For example, the first portion 211*a* may have a piezoelectric characteristic, and the second portion 211*b* may have a ductile characteristic or flexibility. For example, the inorganic material of the first portion 211*a* may have piezoelectric characteristic, and the organic material of the second portion 211*b* may have a ductile characteristic or flexibility.

The vibration portion 211 may include a plurality of first portions 211*a* and a plurality of second portions 211*b*. For example, the plurality of first portions 211*a* and the plurality of second portions 211*b* may be alternately and repeatedly arranged along a second direction Y. Each of the plurality of first portions 211*a* may be disposed between two adjacent second portions 211*b* of the plurality of second portions 211*b*. For example, each of the plurality of first portions 211*a* may have a first width W1 parallel to the second direction Y and a length parallel to a first direction X. Each of the plurality of second portions 211*b* may be disposed in parallel to the second direction Y. For example, each of the plurality of second portions 211*b* may have a second width W2 and a length parallel to the first direction X. Each of the plurality of second portions 211*b* may have the same size, for example, the same width, area, or volume. For example, each of the plurality of second portions 211*b* may have the same size (for example, the same width, area, or volume) within a process error range (or an allowable error) occurring in a manufacturing process. The first width W1 may be the same as or different from the second width W2. For example, the first width W1 may be greater than the second width W2. For example, the first portion 211*a* and the second portion 211*b* may include a line shape or a stripe shape which has the same size or different sizes. Therefore, the vibration portion 211 illustrated in FIG. 4A may include a 2-2 composite structure, and thus may have a resonance frequency of 20 kHz or less, but embodiments of the present disclosure are not limited thereto, and a resonance frequency of the vibration portion 211 may vary based on one or more among a shape, a length, and a thickness of the vibration portion.

Figure 4B:
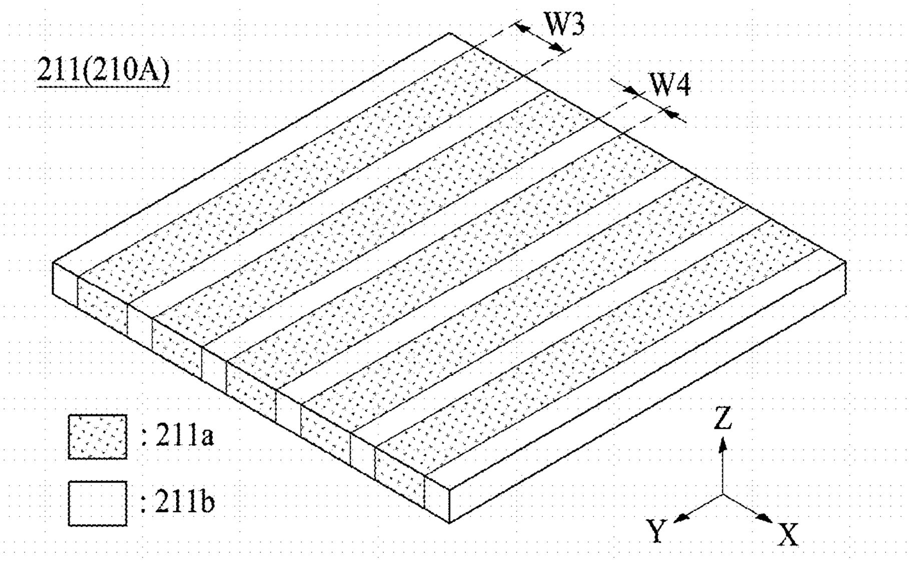

With reference to FIGS. 2, 3, and 4B, a vibration portion 211 of the vibration structure 210A included in the vibration generator 210 according to another embodiment of the present disclosure may include a plurality of first portions 211*a* and a plurality of second portions 211*b*, which may be alternately and repeatedly arranged in a first direction X. Each of the plurality of first portions 211*a* may be disposed between two adjacent second portions 211*b* of the plurality of second portions 211*b*. For example, each of the plurality of first portions 211*a* may have a third width W3 parallel to the first direction X and a length parallel to a second direction Y. Each of the plurality of second portions 211*b* may have a fourth width W4 parallel to the first direction X, and may have a length parallel to the second direction Y. The third width W3 may be the same as or different from the fourth width W4. For example, the third width W3 may be greater than the fourth width W4. For example, the first portion 211*a* and the second portion 211*b* may include a line shape or a stripe shape which has the same size or different sizes. Therefore, the vibration portion 211 illustrated in FIG. 4B may include a 2-2 composite structure, and thus may have a resonance frequency of 20 kHz or less, but embodiments of the present disclosure are not limited thereto, and a resonance frequency of the vibration portion 211 may vary based on one or more among a shape, a length, and a thickness of the vibration portion.

In the vibration portion 211 illustrated in each of FIGS. 4A and 4B, each of the plurality of first portions 211*a* and each of the plurality of second portions 211*b* may be disposed (or arranged) in parallel on the same plane (or the same layer). Each of the plurality of second portions 211*b* may be configured to fill a gap between two adjacent first portions 211*a*. Each of the plurality of second portions 211*b* may be connected to or attached at an adjacent first portion 211*a*. Accordingly, the vibration portion 211 may be enlarged to have a desired size or length based on side coupling (or side connection) between the first portion 211*a* and the second portion 211*b*. In the vibration portion (or vibration layer) 211 illustrated in each of FIGS. 4A and 4B, a width W2 and W4 of each of the plurality of second portions 211*b* may progressively decrease in a direction from a center portion to both peripheries (or both sides or both ends) of the vibration portion 211 or the vibration apparatus.

According to another embodiment of the present disclosure, a second portion 211*b*, having a largest width (W2, W4) of the plurality of second portions 211*b*, may be located at a portion on which a highest stress may concentrate when the vibration portion 211 or the vibration apparatus is vibrating in a vertical (or upper and lower) direction Z (or a thickness direction). A second portion 211*b*, having a smallest width (W2, W4) of the plurality of second portions 211*b*, may be located at a portion where a relatively low stress may occur when the vibration portion 211 or the vibration apparatus is vibrating in the vertical direction Z. For example, the second portion 211*b*, having the largest width (W2, W4) of the plurality of second portions 211*b*, may be disposed at the center portion of the vibration portion 211, and the second portion 211*b*, having the smallest width (W2, W4) of the plurality of second portions 211*b* may be disposed at each of the both peripheries of the vibration portion 211. Therefore, when the vibration portion 211 or the vibration apparatus is vibrating in the vertical direction Z, interference of a sound wave or overlapping of a resonance frequency, each occurring in the portion on which the highest stress concentrates, may be reduced or minimized. Thus, dipping phenomenon of a sound pressure level occurring in the low-pitched sound band may be reduced, thereby improving flatness of a sound characteristic in the low-pitched sound band. For example, flatness of a sound characteristic may be a level of a deviation between a highest sound pressure and a lowest sound pressure.

In the vibration portion 211 illustrated in each of FIGS. 4A and 4B, each of the plurality of first portions 211*a* may have different sizes (or widths). For example, a size (or a width) of each of the plurality of first portions 211*a* may progressively decrease or increase in a direction from the center portion to the both peripheries (or both sides or both ends) of the vibration portion 211 or the vibration apparatus. In this case, in the vibration portion 211, a sound pressure level characteristic of a sound may be enhanced and a sound reproduction band may increase, based on various natural vibration frequencies according to a vibration of each of the plurality of first portions 211*a* having different sizes.

Figure 4C:
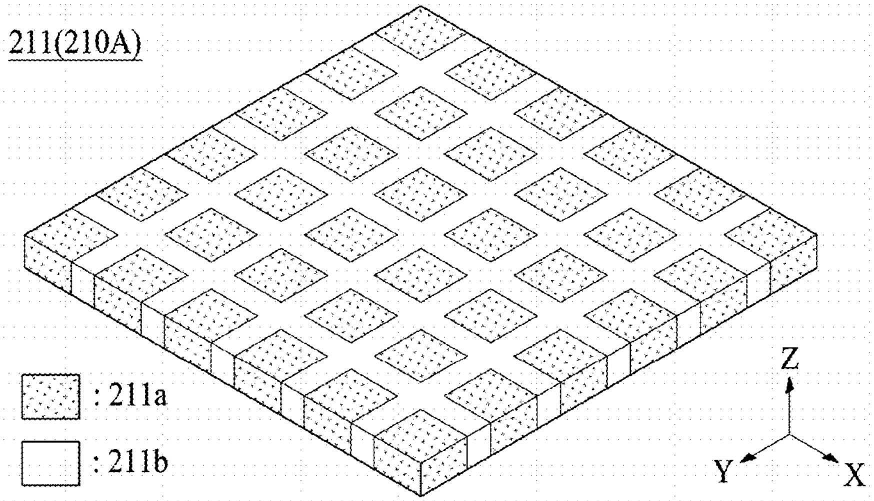

With reference to FIGS. 2, 3, and 4C, a vibration portion 211 of the vibration structure 210A included in the vibration generator 210 according to another embodiment of the present disclosure may include a plurality of first portions 211*a*, which may be spaced apart from one another in a first direction X and a second direction Y, and a second portion 211*b* disposed between the plurality of first portions 211*a*. The plurality of first portions 211*a* may be disposed to be spaced apart from one another in the first direction X and the second direction Y. For example, each of the plurality of first portions 211*a* may have a hexahedral shape (or a six-sided object shape) having the same size and may be disposed in a lattice shape. The second portion 211*b* may be disposed between the plurality of first portions 211*a* in each of the first direction X and the second direction Y. The second portion 211*b* may be configured to fill a gap or a space between two adjacent first portions 211*a* or to surround each of the plurality of first portions 211*a*. Thus, the second portion 211*b* may be connected to or attached to an adjacent first portion 211*a*. For example, a width of a second portion 211*b* disposed between two first portions 211*a* adjacent to each other in the first direction X may be the same as or different from the first portion 211*a*, and a width of a second portion 211*b* disposed between two first portions 211*a* adjacent to each other in the second direction Y may be the same as or different from the first portion 211*a*. Therefore, the vibration portion 211 illustrated in FIG. 4C may have a resonance frequency of 30 MHz or less according to a 1-3 composite structure, but embodiments of the present disclosure are not limited thereto, and a resonance frequency of the vibration portion 211 may vary based on one or more among a shape, a length, and a thickness of the vibration portion.

Figure 4D:
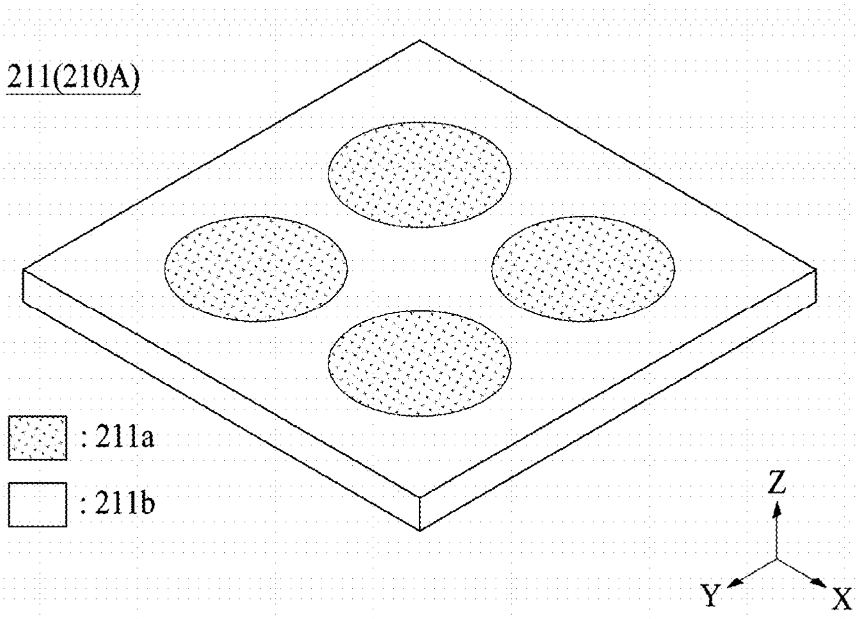

With reference to FIGS. 2, 3, and 4D, a vibration portion 211 of the vibration structure 210A included in the vibration generator 210 according to another embodiment of the present disclosure may include a plurality of first portions 211*a*, which may be spaced apart from one another in a first direction X and a second direction Y, and a second portion 211*b* that surrounds each of the plurality of first portions 211*a*. Each of the plurality of first portions 211*a* may have a flat structure of a circular shape. For example, each of the plurality of first portions 211*a* may have a circular shape, but embodiments of the present disclosure are not limited thereto, and may have a dot shape including an oval shape, a polygonal shape, or a donut shape. The second portion 211*b* may surround each of the plurality of first portions 211*a*. Thus, the second portion 211*b* may be connected to or attached on a side surface of each of the plurality of first portions 211*a*. The plurality of first portions 211*a* and the second portion 211*b* may be disposed (or arranged) in parallel on the same plane (or the same layer). Therefore, the vibration portion 211 illustrated in FIG. 4D may include a 1-3 composite structure, and may be implemented as a circular vibration source (or vibrator), and thus, may be enhanced in vibration characteristic or sound output characteristic and may have a resonance frequency of 30 MHz or less, but embodiments of the present disclosure are not limited thereto, and a resonance frequency of the vibration portion 211 may vary based on one or more among a shape, a length, and a thickness of the vibration portion.

Figure 4E:
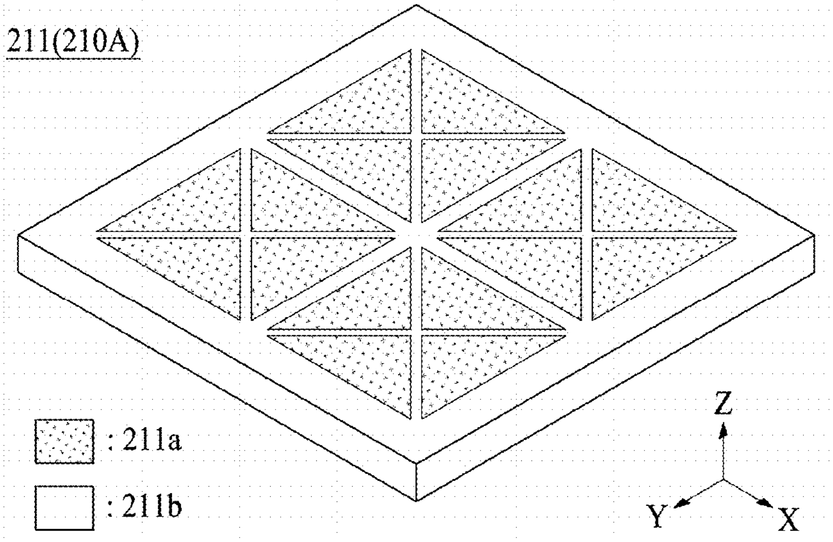

With reference to FIGS. 2, 3, and 4E, a vibration portion 211 of each of the plurality of vibration structures 210A to 210D arranged (or tiled) in the vibration generator 210 according to another embodiment of the present disclosure may include a plurality of first portions 211*a*, which may be spaced apart from one another in a first direction X and a second direction Y, and a second portion 211*b* that surrounds each of the plurality of first portions 211*a*. Each of the plurality of first portions 211*a* may have a flat structure of a triangular shape. For example, each of the plurality of first portions 211*a* may have a triangular plate shape.

According to an embodiment of the present disclosure, four adjacent first portions 211*a* of the plurality of first portions 211*a* may be adjacent to one another to form a tetragonal or quadrilateral shape (or a square shape). Vertices of the four adjacent first portions 211*a* forming a tetragonal shape may be adjacent to one another in a center portion (or a central portion) of the tetragonal shape. The second portion 211*b* may surround each of the plurality of first portions 211*a*. Thus, the second portion 211*b* may be connected to or attached to a side surface (or a lateral surface) of each of the plurality of first portions 211*a*. The plurality of first portions 211*a* and the second portion 211*b* may be disposed (or arranged) in parallel on the same plane (or the same layer). Therefore, the vibration portion 211 illustrated in FIG. 4E may have a resonance frequency of 30 MHz or less according to a 1-3 composite structure, but embodiments of the present disclosure are not limited thereto, and a resonance frequency of the vibration portion 211 may vary based on one or more among a shape, a length, and a thickness of the vibration portion.

Figure 4F:
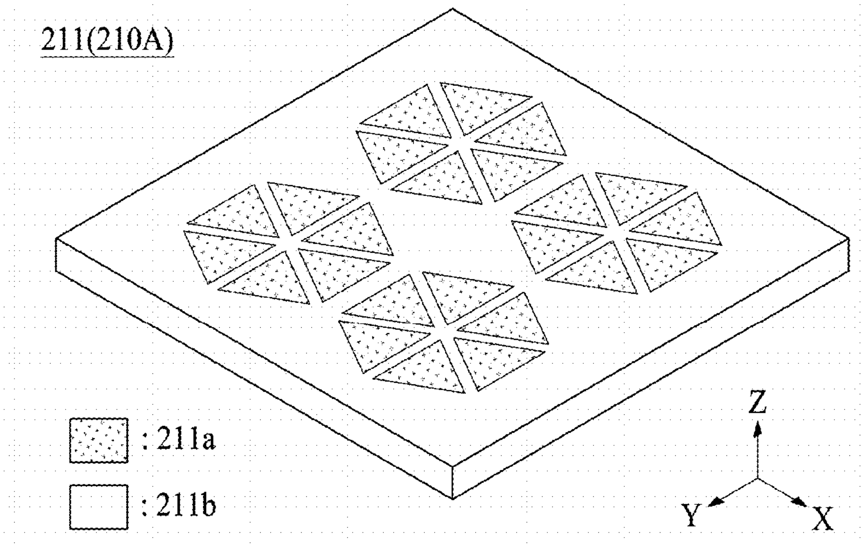

As another embodiment of the present disclosure, as illustrated in FIG. 4F, six adjacent first portions 211*a* among the plurality of first portions 211*a* may be adjacent to one another to form a hexagonal shape (or a regularly hexagonal shape). Vertices of the six adjacent first portions 211*a* forming a hexagonal shape may be adjacent to one another in a center portion (or a central portion) of the hexagonal shape. The second portion 211*b* may surround each of the plurality of first portions 211*a*. Thus, the second portion 211*b* may be connected to or attached on a side surface (or a lateral surface) of each of the plurality of first portions 211*a*. The plurality of first portions 211*a* and the second portion 211*b* may be disposed (or arranged) in parallel on the same plane (or the same layer). Therefore, the vibration portion 211 illustrated in FIG. 4F may include a 1-3 composite structure, and may be implemented as a circular vibration source (or vibrator), and thus, may be enhanced in vibration characteristic or sound output characteristic, and may have a resonance frequency of 30 MHz or less, but embodiments of the present disclosure are not limited thereto, and a resonance frequency of the vibration portion 211 may vary based on one or more among a shape, a length, and a thickness of the vibration portion.

With reference to FIGS. 4E and 4F, 2N (where N is a natural number greater than or equal to 2) adjacent first portions 211*a* among the plurality of first portions 211*a* having the triangular shape may be disposed adjacent to one another to form a 2N-angular shape.

In FIGS. 4A to 4F, the plurality of first portions 211*a* according to an embodiment of the present disclosure may each be configured as an inorganic material portion. The inorganic material portion may include a piezoelectric material or an electroactive material. The piezoelectric material or the electroactive material may have a characteristic in which, when pressure or twisting (or bending) is applied to a crystalline structure by an external force, a potential difference occurs due to dielectric polarization caused by a relative position change of a positive (+) ion and a negative (−) ion, and a vibration is generated by an electric field based on a reverse voltage applied thereto. As described above with reference to FIG. 3, a first surface of each of the plurality of first portions 211*a* may be electrically connected to the first electrode layer E1, and a second surface of each of the plurality of first portions 211_a_ may be electrically connected to the second electrode layer E2.

In FIGS. 4A to 4F, the inorganic material portion included in each of the plurality of first portions 211_a_ may include a ceramic-based material for generating a relatively high vibration, or may include a piezoelectric ceramic having a perovskite-based crystalline structure. The perovskite crystalline structure may have a piezoelectric effect and an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A", and "B" may be cations, and "O" may be anions. For example, the first portions 211_a_ may include one of lead (II) titanate ($PbTiO_3$), lead zirconate ($PbZrO_3$), lead zirconate titanate($PbZrTiO_3$), barium titanate ($BaTiO_3$), and strontium titanate ($SrTiO_3$), but embodiments of the present disclosure are not limited thereto.

When the perovskite crystalline structure includes a center ion (for example, lead (II) titanate), a position of a titanium (Ti) ion may be changed by an external stress or a magnetic field, and thus, polarization may be changed, thereby generating a piezoelectric effect. For example, in the perovskite crystalline structure, a cubic shape corresponding to a symmetric structure may be changed to a tetragonal (or quadrilateral), orthorhombic, or rhombohedral structure corresponding to an unsymmetric structure, and thus, a piezoelectric effect may be generated. In a tetragonal (or quadrilateral), orthorhombic, or rhombohedral structure corresponding to an unsymmetric structure, polarization may be high in a morphotropic phase boundary, and realignment of polarization may be easy, whereby the perovskite crystalline structure may have a high piezoelectric characteristic.

According to an embodiment of the present disclosure, the inorganic material portion included in each of the plurality of first portions 211_a_ may include one or more materials among lead (Pb), zirconium (Zr), titanium (Ti), zinc (Zn), nickel (Ni), and niobium (Nb), but embodiments of the present disclosure are not limited thereto. According to another embodiment of the present disclosure, the inorganic material portion included in each of the plurality of first portions 211_a_ may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. Also, the inorganic material portion may include one or more among calcium titanate ($CaTiO_3$), $BaTiO_3$, and $SrTiO_3$, each without Pb, but embodiments of the present disclosure are not limited thereto.

According to another embodiment of the present disclosure, an inorganic material portion included in each of the plurality of first portions 211_a_ may have a piezoelectric deformation coefficient "$d_{33}$" of 1,000 pC/N or more in a thickness direction Z. The vibration apparatus may be applied to an object having a large size, and may need to have a high piezoelectric deformation coefficient "$d_{33}$", for having a sufficient vibration characteristic or piezoelectric characteristic. For example, to have the high piezoelectric deformation coefficient "$d_{33}$", the inorganic material portion may include a PZT-based material ($PbZrTiO_3$) as a main component, and may include a softener dopant material doped into A site (Pb) and a relaxor ferroelectric material doped into B site (ZrTi).

The softener dopant material may enhance a piezoelectric characteristic and a dielectric characteristic of the inorganic material portion, and for example, may increase the piezoelectric deformation coefficient "$d_{33}$" of the inorganic material portion. The softener dopant material according to an embodiment of the present disclosure may include a dyad element "+2" to a triad element "+3". Morphotropic phase boundary (MPB) may be implemented by adding the softener dopant material to the PZT-based material ($PbZrTiO_3$), and thus, a piezoelectric characteristic and a dielectric characteristic may be enhanced. For example, the softener dopant material may include strontium (Sr), barium (Ba), lanthanum (La), neodymium (Nd), calcium (Ca), yttrium (Y), erbium (Er), or ytterbium (Yb). For example, ions ($Sr^{2+}$, $Ba^{2+}$, $La^{2+}$, $Nd^{3+}$, $Ca^{2+}$, $Y^{3+}$, $Er^{3+}$, $Yb^{3+}$) of the softener dopant material doped into the PZT-based material ($PbZrTiO_3$) may substitute a portion of lead (Pb) in the PZT-based material ($PbZrTiO_3$), and a substitution rate thereof may be about 2 mol % to about 20 mol %. For example, when the substitution rate is smaller than 2 mol % or greater than 20 mol %, a perovskite crystal structure may be broken, and thus, an electromechanical coupling coefficient "kP" and the piezoelectric deformation coefficient "$d_{33}$" may decrease. When the softener dopant material is substituted, the MPB may be formed, and a piezoelectric characteristic and a dielectric characteristic may be high in the MPB, thereby implementing a vibration apparatus having a high piezoelectric characteristic and a high dielectric characteristic.

According to an embodiment of the present disclosure, the relaxor ferroelectric material doped into the PZT-based material ($PbZrTiO_3$) may enhance an electric deformation characteristic of the inorganic material portion. The relaxor ferroelectric material according to an embodiment of the present disclosure may include a lead magnesium niobate (PMN)-based material or a lead nickel niobate (PNN)-based material, but embodiments of the present disclosure are not limited thereto. The PMN-based material may include Pb, Mg, and Nb, and for example, may include $Pb(Mg, Nb)O_3$. The PNN-based material may include Pb, Ni, and Nb, and for example, may include $Pb(Ni, Nb)O_3$. For example, the relaxor ferroelectric material doped into the PZT-based material ($PbZrTiO_3$) may substitute a portion of each of zirconium (Zr) and titanium (Ti) in the PZT-based material ($PbZrTiO_3$), and a substitution rate thereof may be about 5 mol % to about 25 mol %. For example, when the substitution rate is smaller than 5 mol % or greater than 25 mol %, a perovskite crystal structure may be broken, and thus, the electromechanical coupling coefficient "kP" and the piezoelectric deformation coefficient "$d_{33}$" may decrease.

According to an embodiment of the present disclosure, the inorganic material portion provided in each of the plurality of first portions 211_a_ may further include a donor material doped into B site (ZrTi) of the PZT-based material ($PbZrTiO_3$), to more enhance a piezoelectric coefficient. For example, the donor material doped into the B site (ZrTi) may include a tetrad element "+4" or a hexad element "+6". For example, the donor material doped into the B site (ZrTi) may include tellurium (Te), germanium (Ge), uranium (U), bismuth (Bi), niobium (Nb), tantalum (Ta), antimony (Sb), or tungsten (W).

The inorganic material portion provided in each of the plurality of first portions 211_a_ according to an embodiment of the present disclosure may have a piezoelectric deformation coefficient "$d_{33}$" of 1,000 pC/N or more in a thickness direction Z, thereby implementing a vibration apparatus having an enhanced vibration characteristic. For example, a vibration apparatus having an enhanced vibration characteristic may be implemented in an object having a large-area.

In FIGS. 4A to 4F, the second portion 211*b* may be disposed between the plurality of first portions 211*a*, or may be disposed to surround each of the plurality of first portions 211*a*. Therefore, in the vibration portion 211 of the vibration generator 210 or the vibration apparatus 200, vibration energy based on a link in a unit lattice of each first portion 211*a* may increase by a corresponding second portion 211*b*. Thus, a vibration may increase, and a piezoelectric characteristic and flexibility may be secured. For example, the second portion 211*b* may include one of an epoxy-based polymer, an acrylic-based polymer, and a silicone-based polymer, but embodiments of the present disclosure are not limited thereto.

The second portion 211*b* according to an embodiment of the present disclosure may be configured as an organic material portion. For example, the organic material portion may be disposed between the inorganic material portions and may absorb an impact applied to the inorganic material portion (or the first portion), may release a stress concentrating on the inorganic material portion to enhance the total durability of the vibration portion 211 of the vibration generator 210 or the vibration apparatus, and may provide flexibility to the vibration portion 211 of the vibration generator 210 or the vibration apparatus.

The second portion 211*b* according to an embodiment of the present disclosure may have a modulus (or Young's modulus) and viscoelasticity that are lower than the first portion 211*a*. Thus, the second portion 211*b* may enhance the reliability of the first portion 211*a* vulnerable to an impact due to a fragile characteristic. For example, the second portion 211*b* may include a material having a loss coefficient of about 0.01 to about 1.0 and modulus of about 0.1 GPa to about 10 GPa.

The organic material portion configured with the second portion 211*b* may include one or more of an organic material, an organic polymer, an organic piezoelectric material, and an organic non-piezoelectric material that has a flexible characteristic or a ductile characteristic in comparison with the inorganic material portion of the first portions 211*a*. For example, the second portion 211*b* may be referred to as an adhesive portion, a stretch portion, a bending portion, a damping portion, or a flexible portion, or the like, but embodiments of the present disclosure are not limited thereto.

Therefore, the plurality of first portions 211*a* and the second portion 211*b* may be disposed at (or connected to) the same plane, and thus, the vibration portion 211 of the vibration generator 210 according to various embodiments of the present disclosure may have a single thin film-type. For example, the vibration portion 211 may be vibrated in a vertical (or upper and lower) direction (or a thickness direction) by the first portion 211*a* having a vibration characteristic, and may be bent in a curved shape by the second portion 211*b* having flexibility or ductility. Also, in the vibration portion 211 of the vibration generator 210 according to various embodiments of the present disclosure, a size of the first portion 211*a* and a size of the second portion 211*b* may be adjusted based on a piezoelectric characteristic and flexibility needed for the vibration portion 211. For example, in a case where the vibration portion 211 needs a piezoelectric characteristic rather than flexibility, a size of the first portion 211*a* may be adjusted to be greater than the second portion 211*b*. As another embodiment of the present disclosure, when the vibration portion 211 needs flexibility rather than a piezoelectric characteristic, a size of the second portion 211*b* may be adjusted to be greater than the first portion 211*a*. Accordingly, a size of the vibration portion 211 may be adjusted based on a characteristic needed therefor, and thus, the vibration portion 211 may be easy to design.

One or more of the vibration portions 211 illustrated in FIGS. 4A to 4F may be the vibration portion 211 of the vibration structure 210A illustrated in FIG. 2. For example, the vibration structure 210A may be implemented with one or more of the vibration portion 211 described above with reference to FIGS. 4A to 4F, based on a desired characteristic of a sound generated based on a vibration of the vibration apparatus 200. According to an embodiment of the present disclosure, the vibration structure 210A may include one or more of the vibration portions 211 described above with reference to FIGS. 4A to 4F.

Figure 5:
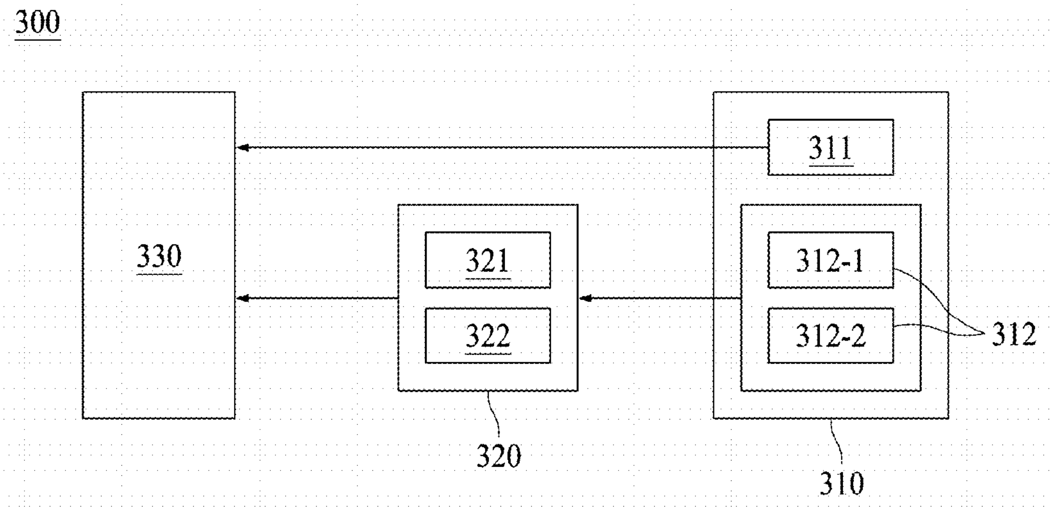
FIG. 5 illustrates the sound processing circuit of FIG. 1.

FIG. 5 illustrates the sound processing circuit of FIG. 1.

With reference to FIGS. 1 and 5, a sound processing circuit 300 according to an embodiment of the present disclosure may generate a vibration driving signal (or a sound signal) based on a sound source signal and a noise signal input thereto, and may supply the generated vibration driving signal to the vibration apparatus 200 to vibrate the vibration apparatus 200. For example, the sound processing circuit 300 may vibrate the vibration generator 210 of the vibration apparatus 200.

According to an embodiment of the present disclosure, the sound processing circuit 300 may generate an alternating current (AC) vibration driving signal including a first-polarity vibration driving signal and a second-polarity vibration driving signal, based on the sound source signal and the noise signal. The first-polarity vibration driving signal may be one of a positive (+) vibration driving signal and a negative (−) vibration driving signal, and the second-polarity vibration driving signal may be another one of the positive (+) vibration driving signal and the negative (−) vibration driving signal. For example, the first-polarity vibration driving signal may be supplied to a first electrode layer E1 of the vibration structure 210A through a first terminal of a flexible cable 220, a first pad electrode of a pad part 201, and a first power supply line PL1. The second-polarity vibration driving signal may be supplied to a second electrode layer E2 of the vibration structure 210A through a second terminal of the flexible cable 220, a second pad electrode of the pad part 201, and a second power supply line PL2.

According to an embodiment of the present disclosure, the sound processing circuit 300 may receive the sound source signal from a sound source supply system 400. For example, the sound source supply system 400 may be a vehicle comfort system, such as a navigation system, an audio system, or a multimedia system installed in a vehicle, but embodiments of the present disclosure are not limited thereto.

According to an embodiment of the present disclosure, the sound processing circuit 300 may receive the noise signal from the microphone apparatus 100. For example, the sound processing circuit 300 may receive a first noise signal from the first microphone 110 and may receive a second noise signal from the second microphone 120.

According to an embodiment of the present disclosure, the sound processing circuit 300 may generate a noise removal signal (or a noise antiphase signal) having a phase opposite to the noise signal to remove the noise signal, based on the noise signal. For example, the sound processing circuit 300 may generate a first noise removal signal (or a first noise antiphase signal) having a phase opposite to the first noise signal to remove the first noise signal, based on the first noise signal. For example, the sound processing circuit 300 may generate a second noise removal signal (or a second noise antiphase signal) having a phase opposite to the second noise signal to remove the second noise signal, based on the second noise signal. For example, the sound processing circuit 300 may combine the sound source signal with the noise removal signal to generate a vibration driving signal. For example, the sound processing circuit 300 may combine the sound source signal, the first noise removal signal, and the second noise removal signal to generate the vibration driving signal.

The sound processing circuit 300 according to an embodiment of the present disclosure may include an input part (or input) 310, a signal processing part (or a noise removal signal generating part or a signal processor) 320, and a driving signal generating part (or a signal combination part) 330. A configuration of the sound processing circuit 300 is not limited thereto.

According to an embodiment of the present disclosure, the input part 310 may receive the sound source signal and the noise signal, and may provide the received sound source signal and noise signal to the signal processing part 320.

According to an embodiment of the present disclosure, the input part 310 may include a first input part (or a sound source input part or a sound source signal input part) 311, which may receive the sound source signal and provides the received sound source signal to the signal processing part 320, and a second input part (or a noise input part or a noise signal input part) 312, which may receive the noise signal and may provide the received noise signal to the signal processing part 320. For example, the second input part 312 may include a 2-1$^{st}$ input part (or a first noise input part or a first noise signal input part) 312-1, which may receive the first noise signal and may provide the received first noise signal to the signal processing part 320, and a 2-2$^{nd}$ input part (or a second noise input part or a second noise signal input part) 312-2, which may receive the second noise signal and may provide the received second noise signal to the signal processing part 320.

According to an embodiment of the present disclosure, the signal processing part 320 may generate the noise removal signal based on the noise signal. For example, the signal processing part 320 may include a noise signal processing part that may generate the noise removal signal based on the noise signal. For example, the signal processing part 320 may include a first noise signal processing part 321, which may generate the first noise removal signal based on the first noise signal, and a second noise signal processing part 322 which may generate the second noise removal signal based on the second noise signal.

According to an embodiment of the present disclosure, the driving signal generating part 330 may generate the vibration driving signal based on the sound source signal and the noise removal signal. For example, the driving signal generating part 330 may combine the sound source signal with the noise removal signal to generate the vibration driving signal. For example, the driving signal generating part 330 may combine the sound source signal, input through the input part 310, with the noise removal signal from the signal processing part 320 to generate the vibration driving signal. For example, the driving signal generating part 330 may combine the sound source signal from the first input part 311, the first noise removal signal from the first noise signal processing part 321, and the second noise removal signal from the second noise signal processing part 322 to generate the vibration driving signal.

Therefore, the sound processing circuit 300 according to an embodiment of the present disclosure may provide the vibration apparatus 200 with the vibration driving signal, which includes the sound source signal corresponding to a sound source and the noise removal signal having a phase opposite to noise, and thus, may vibrate the vibration apparatus 200, whereby a vibration of the vibration apparatus 200 may provide the sound source to the user through bone conduction.

Noise near the user may be transferred to the user through air conduction based on shaking of an eardrum, and the shaking of the eardrum based on noise may be offset and removed by a vibration of the vibration apparatus 200 generated based on the noise removal signal. Accordingly, the user may receive, through bone conduction, only a sound source generated by a vibration of the vibration apparatus 200 based on a sound source signal corresponding to the sound source, and thus, may listen to a high-quality sound source. It is to be noted that the term "near" may refer to a range in which the microphone apparatus 100 may receive noise similar to that occurred at ears of the user, or the generated sound can be easily received by the user, for example, a range from 0 to 50 cm, and, for example, a range from 0 to 20 cm, and as another example, a range from 0 to 10 cm, but embodiments of the present disclosure are not limited thereto.

Figure 6:
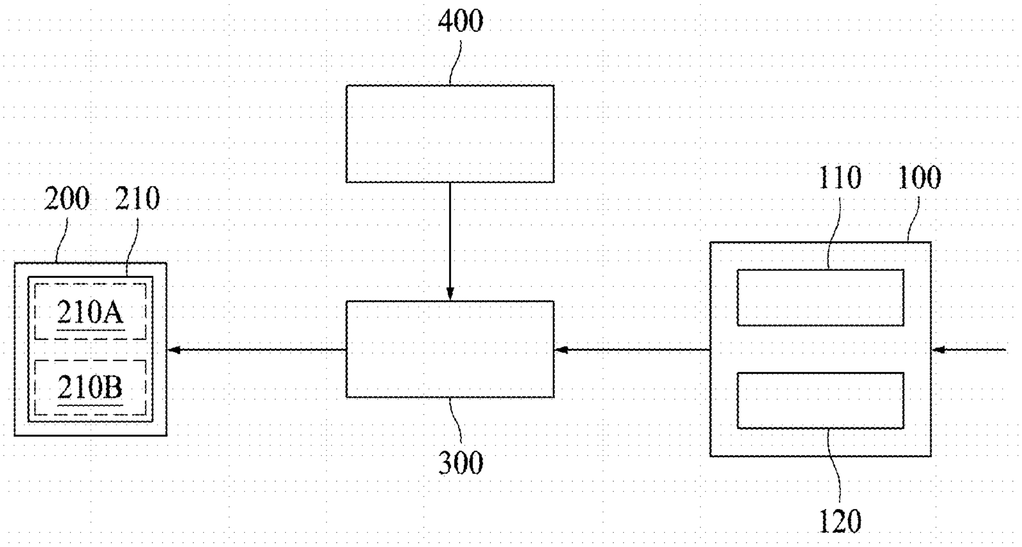
FIG. 6 illustrates a vibration-generating apparatus according to another embodiment of the present disclosure.
Figure 7:
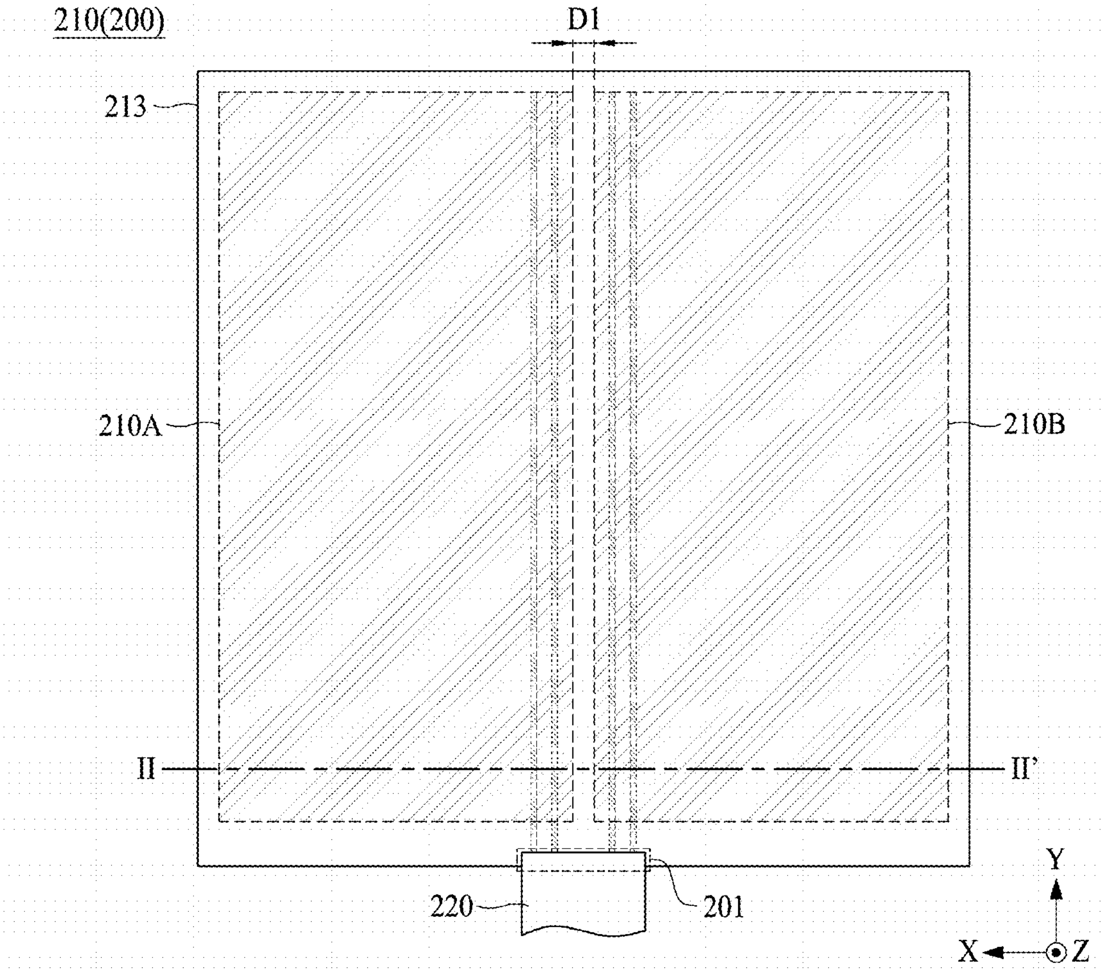
FIG. 7 illustrates a vibration apparatus of FIG. 6.
Figure 8:
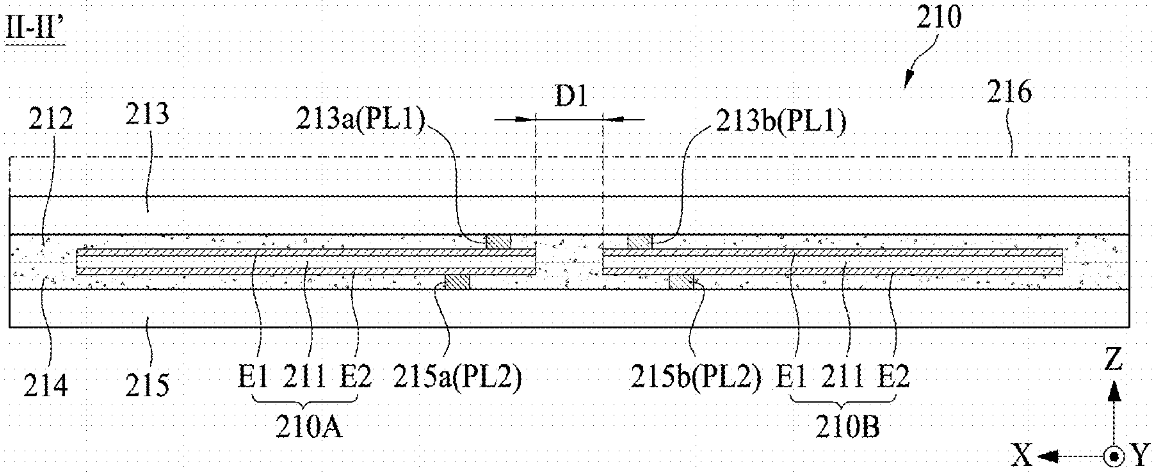
FIG. 8 is a cross-sectional view taken along line II-II' illustrated in FIG. 7.

FIG. 6 illustrates a vibration-generating apparatus according to another embodiment of the present disclosure. FIG. 7 illustrates a vibration apparatus of FIG. 6. FIG. 8 is a cross-sectional view taken along line II-II' illustrated in FIG. 7.

FIG. 6 illustrates an embodiment implemented by modifying a configuration of a vibration generator of a vibration apparatus in the vibration-generating apparatus illustrated in FIG. 1. Hereinafter, therefore, repeated descriptions of elements other than a vibration generator and elements relevant thereto are omitted or will be briefly given.

With reference to FIGS. 6 to 8, a vibration generator 210 according to another embodiment of the present disclosure may include a plurality of vibration structures. For example, the vibration generator 210 according to another embodiment of the present disclosure may include a plurality of vibration structures 210A and 210B that are electrically disconnected from one another, and are disposed spaced apart from one another in a first direction X (or a widthwise direction). The plurality of vibration structures 210A and 210B may be disposed at electrically disconnected from one another, and may be disposed spaced apart from one another in a second direction Y (or a lengthwise direction).

Each of the plurality of vibration structures 210A and 210B may alternately and/or repeatedly contract and expand based on a piezoelectric effect (or a piezoelectric characteristic) to vibrate. The vibration generator 210 according to another embodiment of the present disclosure may alternately and/or repeatedly contract and expand based on an inverse piezoelectric effect (or a piezoelectric characteristic) to vibrate in a thickness direction Z, thereby directly vibrating the target object. The vibration generator 210 may include the plurality of vibration structures 210A and 210B, which may be disposed or tiled at a certain interval. For example, the vibration generator 210 may be referred to as a vibration array, a vibration array portion, a vibration module array portion, a vibration array structure, a tiling vibration array, a tiling vibration array module, or a tiling vibration film, but embodiments of the present disclosure are not limited thereto.

Each of the plurality of vibration structures 210A and 210B according to another embodiment of the present disclosure may have a tetragonal shape or a square shape, but embodiments of the present disclosure are not limited thereto. For example, each of the plurality of vibration structures 210A and 210B may have a tetragonal shape having a width of about 5 cm or more. For example, each of the plurality of vibration structures 210A and 210B may have a square shape having a size of 5 cm×5 cm or more.

The plurality of vibration structures 210A and 210B may be disposed or tiled in i×j form on the same plane, and thus, the vibration generator 210 may have an enlarged area based on tiling of the plurality of vibration structures 210A and 210B having a relatively small size. For example, i may be the number of vibration structures arranged in the first direction X, or may be a natural number of 2 or more; and j may be the number of vibration structures arranged in the second direction Y, or may be a natural number of 1 or more that is the same as or different from i.

The plurality of vibration structures 210A and 210B may be disposed or tiled at a certain interval (or distance), and thus, may be implemented as one vibration apparatus (or a single vibration apparatus) that may be driven as one complete single body without being independently driven. According to another embodiment of the present disclosure, with respect to a first direction X, a separation distance D1 between the plurality of vibration structures 210A and 210B may be variously set based on a size of an object or a user. Thereby, a reproduction band and a sound pressure level characteristic of a sound that is generated based on a single vibration of the plurality of vibration structures 210A and 210B may be increased.

The vibration generator 210 according to another embodiment of the present disclosure may include a first vibration structure 210A and a second vibration structure 210B. According to an embodiment of the present disclosure, the first vibration structure 210A and the second vibration structure 210B may be spaced apart from each other, and may be electrically disconnected from each other in the first direction X. For example, the first vibration structure 210A and the second vibration structure 210B may be arranged or tiled in a 2×1 form.

According to an embodiment of the present disclosure, the first vibration structure 210A may be disposed at a third region of an object, and the second vibration structure 210B may be disposed at a fourth region of the object. For example, the third region of the object may be a region of the object corresponding to a left ear of a user, and the fourth region of the object may be a region of the object corresponding to a right ear of the user.

According to an embodiment of the present disclosure, the first vibration structure 210A may vibrate based on a vibration driving signal from the sound processing circuit 300 to vibrate the third region of the object (or a left ear of the user). For example, the first vibration structure 210A may vibrate based on the vibration driving signal to vibrate the left ear of the user or a region near the left ear of the user. For example, the first vibration structure 210A may vibrate based on a first vibration driving signal (or a left vibration driving signal or a first sound signal) from the sound processing circuit 300 to vibrate the left ear of the user or the region near the left ear of the user (or the third region of the object).

According to an embodiment of the present disclosure, the second vibration structure 210B may vibrate based on the vibration driving signal from the sound processing circuit 300 to vibrate the fourth region of the object (or a right ear of the user). For example, the second vibration structure 210B may vibrate the right ear of the user or a region near the right ear of the user based on the vibration driving signal. For example, the second vibration structure 210B may vibrate based on a second vibration driving signal (or a right vibration driving signal or a second sound signal) from the sound processing circuit 300 to vibrate the right ear of the user or the region near the right ear of the user (or the fourth region of the object).

According to an embodiment of the present disclosure, each of the first vibration driving signal and the second vibration driving signal provided to the first vibration structure 210A and the second vibration structure 210B may be the same or differ.

In the vibration-generating apparatus according to another embodiment of the present disclosure, the sound processing circuit 300 may generate the vibration driving signal based on the sound source signal and the noise signal, and may supply the generated vibration driving signal to the vibration apparatus 200 to vibrate the vibration apparatus 200.

According to an embodiment of the present disclosure, the sound processing circuit 300 may supply the vibration driving signal to each of the first and second vibration structures 210A and 210B. For example, the sound processing circuit 300 may supply the first vibration driving signal to the first vibration structure 210A, and may supply the second vibration driving signal to the second vibration structure 210B.

According to an embodiment of the present disclosure, the sound processing circuit 300 may supply the first vibration driving signal generated based on the sound source signal and the first noise removal signal to the first vibration structure 210A, and may supply the second vibration driving signal generated based on the sound source signal and the second noise removal signal to the second vibration structure 210B.

In the vibration-generating apparatus according to another embodiment of the present disclosure, the sound processing circuit 300 may generate the first vibration driving signal based on the sound source signal and the first noise removal signal, and may supply the first vibration driving signal to the first vibration structure 210A. Moreover, the sound processing circuit 300 may generate the second vibration driving signal based on the sound source signal and the second noise removal signal, and may supply the second vibration driving signal to the second vibration structure 210B.

Therefore, noise transferred through air conduction and the left ear may be offset and removed by a vibration of the first vibration structure 210A corresponding to the first noise removal signal included in the first vibration driving signal, and noise transferred through air conduction and the right ear may be offset and removed by a vibration of the second vibration structure 210B corresponding to the second noise removal signal included in the second vibration driving signal. Thus, the user may be provided with the vibrations of the first and second vibration structures 210A and 210B corresponding to the sound source signal, whereby the user may listen to a high-quality sound source.

Each of the first vibration structure 210A and the second vibration structure 210B according to another embodiment of the present disclosure may include a vibration portion 211, a first electrode layer E1, and a second electrode layer E2. A description of the vibration portion 211, the first electrode layer E1, and the second electrode layer E2 may be substantially the same as descriptions given above with reference to FIGS. 2 and 3, and thus, their repetitive descriptions may be omitted or will be briefly given.

The vibration generator 210 according to another embodiment of the present disclosure may include a first protection member 213 and a second protection member 215. The first protection member 213 may be disposed at the first surface of the vibration generator 210. For example, the first protection member 213 may disposed on a first surface of each of the plurality of vibration structures 210A and 210B. For example, the first protection member 213 may cover the first electrode layer E1 disposed at a first surface of each of the plurality of vibration structures 210A and 210B. Thus, the first protection member 213 may be connected to the first surface of each of the plurality of vibration structures 210A and 210B in common, or may support the first surface of each of the plurality of vibration structures 210A and 210B in common. Accordingly, the first protection member 213 may protect the first surface of each of the plurality of vibration structures 210A and 210B or the first electrode layer E1.

The first protection member 213 according to another embodiment of the present disclosure may be disposed at the first surface of each of the plurality of vibration structures 210A and 210B by a first adhesive layer 212. For example, the first protection member 213 may be directly disposed at the first surface of each of the plurality of vibration structures 210A and 210B by a film laminating process using the first adhesive layer 212. Accordingly, the plurality of vibration structures 210A and 210B may be integrated (or disposed) or tiled with the first protection member 213 to have the certain intervals D1 and D2.

The second protection member 215 may be disposed at the second surface of the vibration generator 210. For example, the second protection member 215 may cover the second electrode layer E2 disposed at a second surface of each of the plurality of vibration structures 210A and 210B. Thus, the second protection member 215 may be connected to the second surface of each of the plurality of vibration structures 210A and 210B in common or may support the second surface of each of the plurality of vibration structures 210A and 210B in common. Accordingly, the second protection member 215 may protect the second surface of each of the plurality of vibration structures 210A and 210B or the second electrode layer E2.

The second protection member 215 according to another embodiment of the present disclosure may be disposed at the second surface of each of the plurality of vibration structures 210A and 210B by a second adhesive layer 214. For example, the second protection member 215 may be directly disposed at the second surface of each of the plurality of vibration structures 210A and 210B by a film laminating process using the second adhesive layer 214. Accordingly, the plurality of vibration structures 210A and 210B may be integrated (or disposed) or tiled with the second protection member 215 to have the certain intervals D1 and D2.

Each of the first protection member 213 and the second protection member 215 according to an embodiment of the present disclosure may include a plastic film. For example, each of the first protection member 213 and the second protection member 215 may be a polyimide (PI) film or a polyethylene terephthalate (PET) film, but embodiments of the present disclosure are not limited thereto.

The first adhesive layer 212 may be disposed at the first surface of each of the plurality of vibration structures 210A and 210B and between the plurality of vibration structures 210A and 210B. For example, the first adhesive layer 212 may be formed on a rear surface (or an inner surface) of the first protection member 213 facing the first surface of the vibration generator 210, disposed at the first surface of each of the plurality of vibration structures 210A and 210B, and filled between the plurality of vibration structures 210A and 210B.

The second adhesive layer 214 may be disposed at the second surface of each of the plurality of vibration structures 210A and 210B and between the plurality of vibration structures 210A and 210B. For example, the second adhesive layer 214 may be formed on a front surface (or an inner surface) of the second protection member 215 facing the second surface of the vibration generator 210, disposed at the second surface of each of the plurality of vibration structures 210A and 210B, and filled between the plurality of vibration structures 210A and 210B.

The first and second adhesive layers 212 and 214 may be connected to each other between the plurality of vibration structures 210A and 210B. Therefore, each of the plurality of vibration structures 210A and 210B may be surrounded by the first and second adhesive layers 212 and 214. For example, the first and second adhesive layers 212 and 214 may entirely surround the whole plurality of vibration structures 210A and 210B. For example, the first and second adhesive layers 212 and 214 may be referred to as a cover member, but embodiments of the present disclosure are not limited thereto. When each of the first and second adhesive layers 212 and 214 is a cover member, the first protection member 213 may be disposed at a first surface of the cover member, and the second protection member 215 may be disposed at a second surface of the cover member. For example, for convenience of description, the first and second adhesive layers 212 and 214 are illustrated as first and second adhesive layers 212 and 214, but embodiments of the present disclosure are not limited thereto, and may be provided as one adhesive layer.

Each of the first and second adhesive layers 212 and 214 according to another embodiment of the present disclosure may include an electric insulating material, which has adhesiveness, and may include a material capable of compression and decompression. For example, each of the first and second adhesive layers 212 and 214 may include an epoxy resin, an acrylic resin, a silicone resin, or a urethane resin, but embodiments of the present disclosure are not limited thereto.

The vibration apparatus 200 or the vibration generator 210 according to another embodiment of the present disclosure may further include a first power supply line PL1, a second power supply line PL2, and a pad part 201. The first power supply line PL1 may be disposed at the first protection member 213. For example, the first power supply line PL1 may be disposed at a rear surface of the first protection member 213 facing the first surface of the vibration generator 210. The first power supply line PL1 may be electrically connected to the first electrode layer E1 of each of the plurality of vibration structures 210A and 210B. For example, the first power supply line PL1 may be directly and electrically connected to the first electrode layer E1 of each of the plurality of vibration structures 210A and 210B. For example, the first power supply line PL1 may be electrically connected to the first electrode layer E1 of each of the plurality of vibration structures 210A and 210B by an anisotropic conductive film. As another embodiment of the present disclosure, the first power supply line PL1 may be electrically connected to the first electrode layer E1 of each of the plurality of vibration structures 210A and 210B by a conductive material (or particle) included in the first adhesive layer 212.

The first power supply line PL1 according to another embodiment of the present disclosure may include first and second upper power lines 213*a* and 213*b* disposed in a second direction Y. For example, the first upper power line 213*a* may be electrically connected to the first electrode layer E1 of the first vibration structure 210A of the plurality of vibration structures 210A and 210B. The second upper power line 213*b* may be electrically connected to the first electrode layer E1 of the second vibration structure 210B of the plurality of vibration structures 210A and 210B.

The second power supply line PL2 may be disposed at the second protection member 215. For example, the second power supply line PL2 may be disposed at a front surface of the second protection member 215 facing the second surface of the vibration generator 210. The second power supply line PL2 may be electrically connected to the second electrode layer E2 of each of the plurality of vibration structures 210A and 210B. For example, the second power supply line PL2 may be directly and electrically connected to the second electrode layer E2 of each of the plurality of vibration structures 210A and 210B. For example, the second power supply line PL2 may be electrically connected to the second electrode layer E2 of each of the plurality of vibration structures 210A and 210B by an anisotropic conductive film. As another embodiment of the present disclosure, the second power supply line PL2 may be electrically connected to the second electrode layer E2 of each of the plurality of vibration structures 210A and 210B by a conductive material (or particle) included in the second adhesive layer 214.

The second power supply line PL2 according to another embodiment of the present disclosure may include first and second lower power lines 215*a* and 215*b* disposed in a second direction Y. For example, the first lower power line 215*a* may be electrically connected to the second electrode layer E2 of the first vibration structure 210A of the plurality of vibration structures 210A and 210B. The second lower power line 215*b* may be electrically connected to the second electrode layer E2 of the second vibration structure 210B of the plurality of vibration structures 210A and 210B.

The pad part 201 may be electrically connected to the first power supply line PL1 and the second power supply line PL2. The pad part 201 may be disposed in the vibration generator 210 to be electrically connected to one portion (or one end) of each of the first power supply line PL1 and the second power supply line PL2. The pad part 201 according to an embodiment of the present disclosure may include a first pad electrode and a second pad electrode. The first pad electrode may be electrically connected to one portion of the first power supply line PL1. The second pad electrode may be electrically connected to one portion of the second power supply line PL2.

The first pad electrode may be connected to one portion of each of the first and second upper power lines 213*a* and 213*b* of the first power supply line PL1 in common. For example, the one portion of each of the first and second upper power lines 213*a* and 213*b* may branch from the first pad electrode.

The second pad electrode may be connected to one portion of each of the first and second lower power lines 215*a* and 215*b* of the second power supply line PL2 in common. For example, the one portion of each of the first and second lower power lines 215*a* and 215*b* may branch from the second pad electrode.

The vibration apparatus 200 or the vibration generator 210 according to another embodiment of the present disclosure may further include a flexible cable 220. The flexible cable 220 may be electrically connected to the pad part 201 disposed in the vibration apparatus 200 or the vibration generator 210, and may supply the vibration apparatus 200 or the vibration generator 210 with vibration driving signals (or a sound signal) provided from a sound processing circuit.

The flexible cable 220 according to another embodiment of the present disclosure may include a first terminal and a second terminal. A first terminal may be electrically connected to the first pad electrode of the pad part 201. The second terminal may be electrically connected to the second pad electrode of the pad part 201. For example, the flexible cable 220 may be configured as a flexible printed circuit cable or a flexible flat cable, but embodiments of the present disclosure are not limited thereto.

The vibration generator 210 according to another embodiment of the present disclosure may further include a plate 216. The plate 216 may be the same as the plate 216 described above with reference to FIGS. 2 and 3, and thus, its description is omitted.

Figure 9:
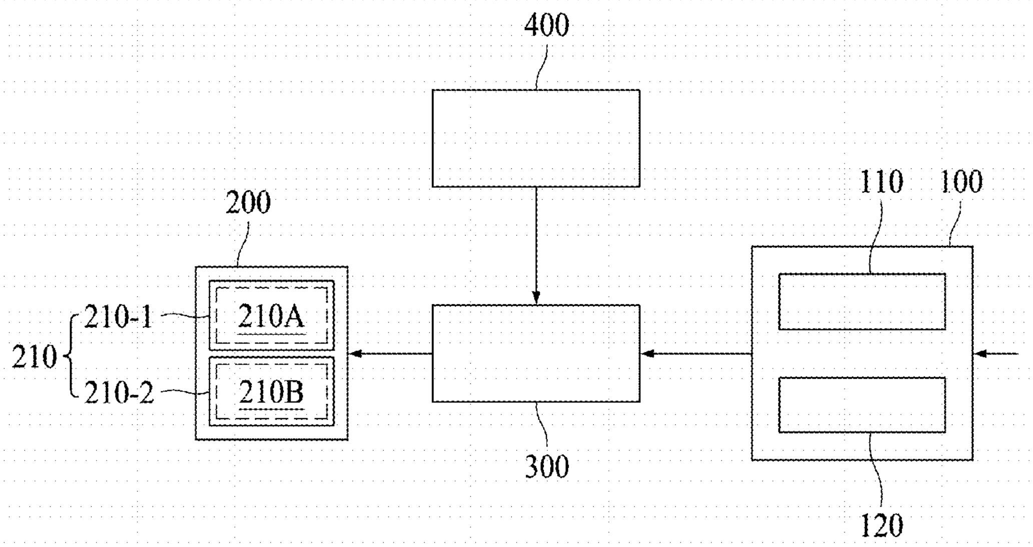
FIG. 9 illustrates a vibration-generating apparatus according to another embodiment of the present disclosure.

FIG. 9 illustrates a vibration-generating apparatus according to another embodiment of the present disclosure.

FIG. 9 illustrates an embodiment implemented by modifying a configuration of a vibration apparatus in the vibration-generating apparatus illustrated in FIG. 1. Hereinafter, therefore, repeated descriptions of elements other than a vibration apparatus and elements relevant thereto are omitted or will be briefly given.

With reference to FIG. 9, a vibration apparatus 200 of the vibration-generating apparatus according to another embodiment of the present disclosure may include a plurality of vibration generators. For example, the vibration apparatus 200 may include a first vibration generator (or a left vibration generator) 210-1, which is disposed at a third region of an object and vibrates based on a vibration driving signal (or a sound signal), and a second vibration generator (or a right vibration generator) 210-2, which is disposed at a fourth region of the object and vibrates based on the vibration driving signal. For example, each of the first vibration generator 210-1 and the second vibration generator 210-2 may be provided as one or in plurality.

According to an embodiment of the present disclosure, the first vibration generator 210-1 and the second vibration generator 210-2 may include the same elements as those of the vibration generator 210 described above with reference to FIGS. 2 to 5F. For example, the third region of the object may be a region of the object corresponding to a left ear of a user, and the fourth region of the object may be a region of the object corresponding to a right ear of the user.

According to an embodiment of the present disclosure, each of the first vibration generator 210-1 and the second vibration generator 210-2 may include a plurality of vibration structures 210A and 210B. For example, the first vibration generator 210-1 may include a first vibration structure 210A, and the second vibration generator 210-2 may include a second vibration structure 210B. For example, each of the first and second vibration structures 210A and 210B may be provided as one or in plurality.

According to an embodiment of the present disclosure, the first vibration generator 210-1 may vibrate based on a vibration driving signal from the sound processing circuit 300 to vibrate the left ear of the user. For example, the first vibration generator 210-1 may vibrate based on the vibration driving signal to vibrate the left ear of the user and a region near the left ear of the user. For example, the first vibration generator 210-1 may vibrate based on a first vibration driving signal (or a left vibration driving signal or a first sound signal) to vibrate the left ear of the user or the region near the left ear of the user.

According to an embodiment of the present disclosure, the second vibration generator 210-2 may vibrate based on the vibration driving signal from the sound processing circuit 300 to vibrate the right ear of the user. For example, the second vibration generator 210-2 may vibrate based on the vibration driving signal to vibrate the right ear of the user and a region near the right ear of the user. For example, the second vibration generator 210-2 may vibrate based on a second vibration driving signal (or a right vibration driving signal or a second sound signal) to vibrate the right ear of the user or the region near the right ear of the user.

According to an embodiment of the present disclosure, the first vibration driving signal and the second vibration driving signal respectively provided to the first vibration generator 210-1 and the second vibration generator 210-2 may be the same or differ. For example, the first vibration driving signal may be supplied to a plurality of first vibration structures 210A of the first vibration generator 210-1 in common, and the second vibration driving signal may be supplied to a plurality of second vibration structures 210B of the second vibration generator 210-2 in common.

In the vibration-generating apparatus according to another embodiment of the present disclosure, the sound processing circuit 300 may generate the vibration driving signal based on a sound source signal and a noise signal and may supply the generated vibration driving signal to the vibration apparatus 200 to vibrate the vibration apparatus 200. For example, the sound processing circuit 300 may supply the vibration driving signal to the first and second vibration generators 210-1 and 210-2 of the vibration apparatus 200. For example, the sound processing circuit 300 may supply the first vibration driving signal to the first vibration generator 210-1, and may supply the second vibration driving signal to the second vibration generator 210-2.

According to an embodiment of the present disclosure, the sound processing circuit 300 may supply the first vibration driving signal generated based on the sound source signal and the first noise removal signal to the first vibration generator 210-1, and may supply the second vibration driving signal generated based on the sound source signal and the second noise removal signal to the second vibration generator 210-2.

In the vibration-generating apparatus according to another embodiment of the present disclosure, the sound processing circuit 300 may generate the first vibration driving signal based on the sound source signal and the first noise removal signal, and may supply the first vibration driving signal to the first vibration structure 210-1. Moreover, the sound processing circuit 300 may generate the second vibration driving signal based on the sound source signal and the second noise removal signal, and may supply the second vibration driving signal to the second vibration generator 210-2.

Therefore, noise transferred through air conduction to the left ear may be offset and removed by a vibration of the first vibration generator 210-1 corresponding to the first noise removal signal included in the first vibration driving signal, and noise transferred through air conduction to the right ear may be offset and removed by a vibration of the second vibration generator 210-2 corresponding to the second noise removal signal included in the second vibration driving signal. Thus, the user may be provided with the vibrations of the first and second vibration generators 210-1 and 210-2 corresponding to the sound source signal, whereby the user may listen to a high-quality sound source.

Figure 10:
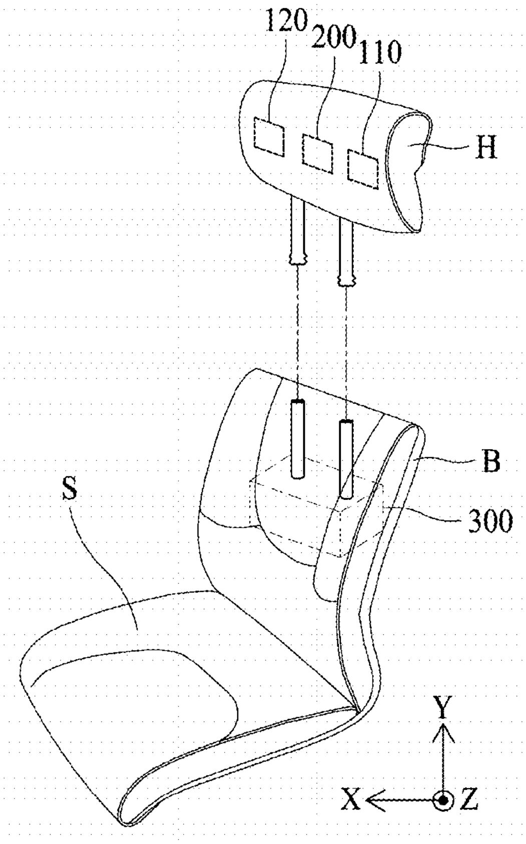
FIG. 10 illustrates a vehicle according to an embodiment of the present disclosure.
Figure 11:
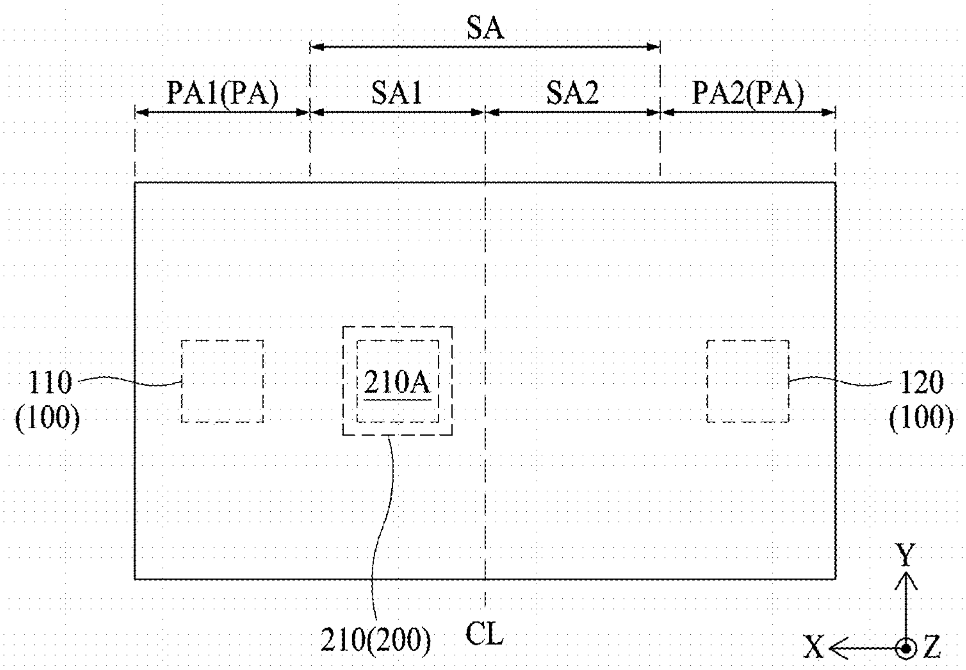
FIGS. 11 to 13 illustrate a headrest of FIG. 10.
Figure 12:
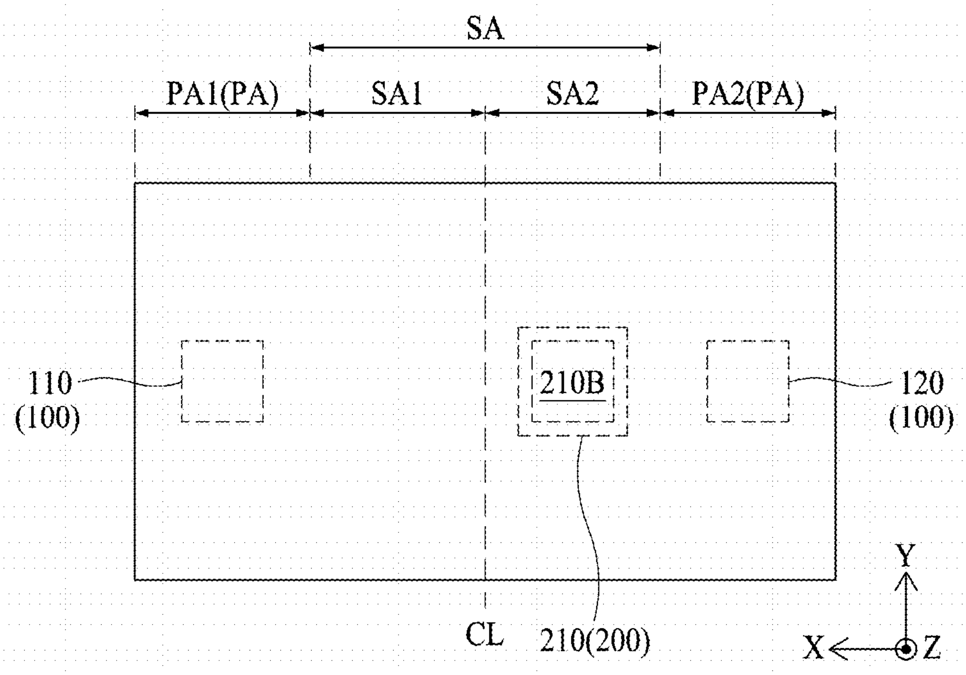
Figure 13:
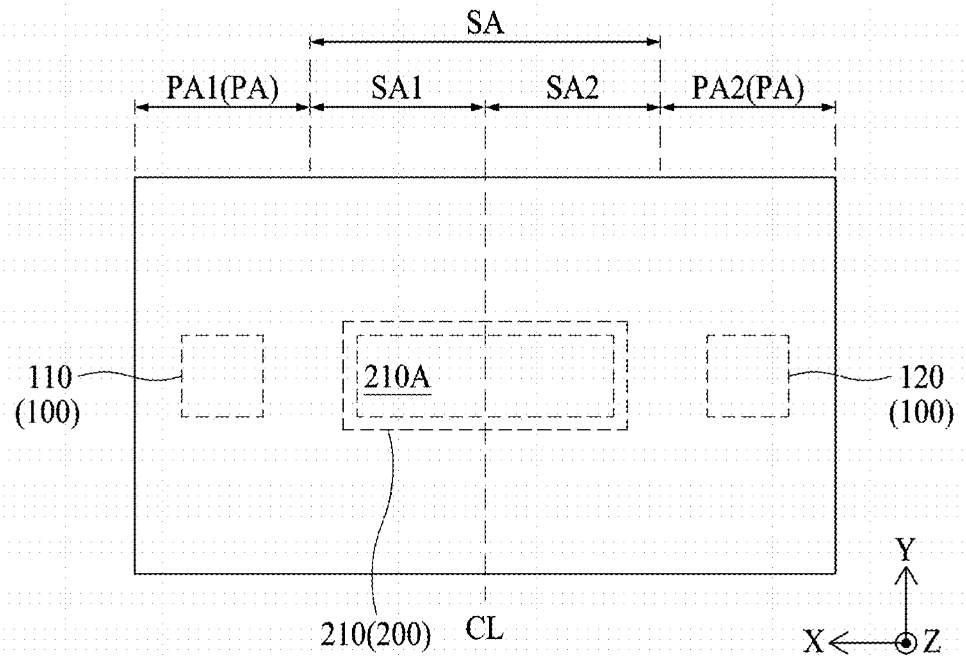

FIG. 10 illustrates a vehicle according to an embodiment of the present disclosure. FIGS. 11 to 13 illustrate a headrest of FIG. 10.

FIG. 10 illustrates a seat of a vehicle according to an embodiment of the present disclosure. With reference to FIGS. 1 and 10 to 13, the vibration-generating apparatus according to an embodiment of the present disclosure may be disposed at the seat of the vehicle. For example, the vibration-generating apparatus may be disposed in all seats of the vehicle, including a driver seat and a passenger seat.

A vibration apparatus 200 may be disposed in a headrest H of the seat. A microphone apparatus 100 may be disposed adjacent to the vibration apparatus 200, and for example, may be disposed in the headrest H of the seat. A sound processing circuit 300 may be disposed in the seat, and for example, may be disposed in the headrest H, a back B, and a saddle S of the seat.

For example, the headrest H may include a supporting region SA, which may be disposed at a center region of the headrest H with respect to a center line CL, and may support a head of a user (or a passenger), and a periphery region PA disposed at a periphery of the headrest H. For example, the supporting region SA may include a first supporting region (or a left supporting region) SA1, which is a left region with respect to the center line CL, and a second supporting region (or a right supporting region) SA2, which is a right region with respect to the center line CL. For example, the first supporting region SA1 may be a region where a left ear of the user may be disposed, and the second supporting region SA2 may be a region where a right ear of the user may be disposed. For example, the periphery region PA may include a first periphery region (or a left periphery region) PA1, which is a left periphery of the headrest H, and a second periphery region (or a right periphery region) PA2, which is a right periphery of the headrest H. For example, the first periphery region PA1 may be disposed at the left of the first supporting region SA1, and the second periphery region PA2 may be disposed at the right of the second supporting region SA2.

The vehicle according to an embodiment of the present disclosure may include the vibration-generating apparatus illustrated in FIG. 1. The vehicle according to an embodiment of the present disclosure may include the microphone apparatus 100 and the vibration apparatus 200, which may be disposed at the headrest H.

According to an embodiment of the present disclosure, the microphone apparatus 100 may include a first microphone 110 disposed in the first periphery region PA1 and a second microphone 120 disposed in the second periphery region PA2. For example, the first microphone 110 may be disposed in the first periphery region PA1, and may receive noise of the first periphery region PA1. For example, the first microphone 110 may receive noise near the left ear of the user. For example, the second microphone 120 may be disposed in the second periphery region PA2, and may receive noise of the second periphery region PA2. For example, the second microphone 120 may receive noise near the right ear of the user. The first microphone 110 and the second microphone 120 may convert the received noise into an electrical signal, and may provide a noise signal to the sound processing circuit 300.

With reference to FIG. 11, the vibration apparatus 200 may be disposed at the first supporting region SA1. For example, the vibration apparatus 200 may include a vibration generator 210 disposed at the first supporting region SA1, and the vibration generator 210 may include one or more vibration structures 210A.

The vibration apparatus 200 may vibrate based on the vibration driving signal from the sound processing circuit 300. For example, the vibration generator 210 or the vibration structure 210A may vibrate based on the vibration driving signal from the sound processing circuit 300 to vibrate the first supporting region SA1. For example, the vibration generator 210 or the vibration structure 210A may vibrate based on the vibration driving signal from the sound processing circuit 300 to vibrate the left ear of the user disposed at the first supporting region SA1. For example, the vibration generator 210 or the vibration structure 210A may vibrate based on the vibration driving signal from the sound processing circuit 300 to vibrate the left ear of the user and a region near the left ear of the user, which may be disposed at the first supporting region SA1.

With reference to FIG. 12, the vibration apparatus 200 may be disposed at the second supporting region SA2. For example, the vibration apparatus 200 may include a vibration generator 210 disposed at the second supporting region SA2. For example, the vibration generator 210 may include one vibration structure 210B disposed at the second supporting region SA2.

The vibration apparatus 200 may vibrate based on the vibration driving signal from the sound processing circuit 300. For example, the vibration generator 210 or the vibration structure 210B may vibrate based on the vibration driving signal from the sound processing circuit 300 to vibrate the second supporting region SA2. For example, the vibration generator 210 or the vibration structure 210B may vibrate based on the vibration driving signal from the sound processing circuit 300 to vibrate the right ear of the user disposed at the second supporting region SA2. For example, the vibration generator 210 or the vibration structure 210B may vibrate based on the vibration driving signal from the sound processing circuit 300 to vibrate the right ear of the user and a region near the right ear of the user, which may be disposed at the second supporting region SA2.

With reference to FIG. 13, the vibration apparatus 200 may be disposed at the first supporting region SA1 and the second supporting region SA2. For example, the vibration apparatus 200 may include a vibration generator 210 disposed at the first supporting region SA1 and the second supporting region SA2. For example, the vibration generator 210 may include one or more vibration structures 210A disposed at the first supporting region SA1 and the second supporting region SA2.

The vibration apparatus 200 may vibrate based on the vibration driving signal from the sound processing circuit 300. For example, the vibration generator 210 or the vibration structure 210A may vibrate based on the vibration driving signal from the sound processing circuit 300 to vibrate the first supporting region SA1 and the second supporting region SA2. For example, the vibration generator 210 or the vibration structure 210A may vibrate based on the vibration driving signal from the sound processing circuit 300 to vibrate the left ear and the right car of the user disposed at the first and second supporting regions SA1 and SA2. For example, the vibration generator 210 or the vibration structure 210A may vibrate based on the vibration driving signal from the sound processing circuit 300 to vibrate the left ear of the user, a region near the left ear of the user, the right ear of the user, and a region near the right ear of the user, which may be disposed at first and second supporting regions SA1 and SA2.

Figure 14:
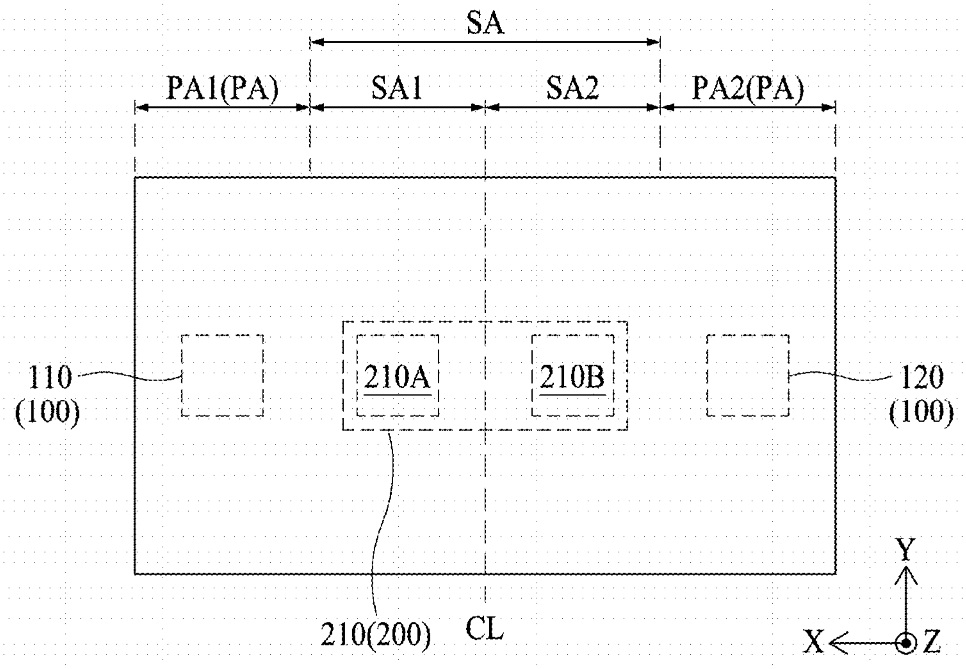
FIGS. 14 and 15 illustrate a headrest of a vehicle according to another embodiment of the present disclosure.
Figure 15:
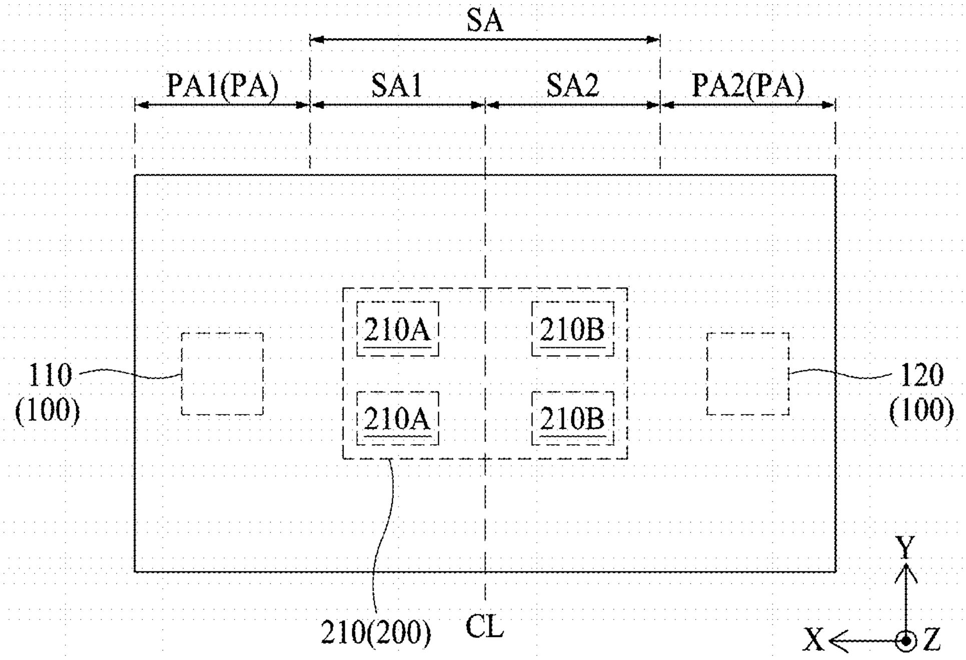

FIGS. 14 and 15 illustrate a headrest of a vehicle according to another embodiment of the present disclosure.

FIGS. 14 and 15 illustrate an embodiment implemented by modifying a configuration of the headrest of the vehicle illustrated in FIG. 10. Hereinafter, therefore, repeated descriptions of elements, other than a vibration apparatus and elements relevant thereto, are omitted or will be briefly given.

The vehicle according to another embodiment of the present disclosure may include the vibration-generating apparatus of FIG. 6. With reference to FIGS. 6, 14, and 15, the vehicle according to another embodiment of the present disclosure may include a microphone apparatus 100 and a vibration apparatus 200, which may be disposed at a headrest H.

According to an embodiment of the present disclosure, the microphone apparatus 100 may include a first microphone 110 disposed in a first periphery region PA1, and a second microphone 120 disposed in a second periphery region PA2. For example, the first microphone 110 may be disposed in the first periphery region PA1, and may receive noise of the first periphery region PA1. For example, the first microphone 110 may receive noise near a left ear of a user. For example, the second microphone 120 may be disposed in the second periphery region PA2 and may receive noise of the second periphery region PA2. For example, the second microphone 120 may receive noise near a right ear of the user. The first microphone 110 and the second microphone 120 may convert the received noise into an electrical signal, and may provide a noise signal to the sound processing circuit 300.

The vibration apparatus 200 may vibrate a first supporting region SA1 and a second supporting region SA2 based on the vibration driving signal from the sound processing circuit 300, and may include a vibration generator 210. The vibration generator 210 may include a plurality of vibration structures 210A and 210B.

With reference to FIG. 14, the vibration generator 210 may include one first vibration structure 210A disposed at the first supporting region SA1, and one second vibration structure 210B disposed at the second supporting region SA2. The one first vibration structure 210A may vibrate based on a first vibration driving signal to vibrate the first supporting region SA1. The one second vibration structure 210B may vibrate based on a second vibration driving signal to vibrate the second supporting region SA2.

According to an embodiment of the present disclosure, the one first vibration structure 210A may vibrate based on the first vibration driving signal to vibrate the left ear of the user disposed at the first supporting region SA1. For example, the one first vibration structure 210A may vibrate based on the first vibration driving signal to vibrate the left ear of the user and a region near the left ear of the user, which may be disposed at the first supporting region SA1.

According to an embodiment of the present disclosure, the one second vibration structure 210B may vibrate based on the second vibration driving signal to vibrate the right ear of the user disposed at the second supporting region SA2. For example, the one second vibration structure 210B may vibrate based on the second vibration driving signal to vibrate the right ear of the user and a region near the right ear of the user, which may be disposed at the second supporting region SA2.

According to an embodiment of the present disclosure, the one first vibration structure 210A and the one second vibration structure 210B may be disposed to be symmetrical with respect to a center line CL, but embodiments of the present disclosure are not limited thereto. For example, the one first vibration structure 210A and the one second vibration structure 210B may be disposed in parallel in a first direction (or a widthwise direction of a headrest) X, but embodiments of the present disclosure are not limited thereto. For example, the one first vibration structure 210A and the one second vibration structure 210B may be disposed on the same plane in a supporting region SA, but embodiments of the present disclosure are not limited thereto.

With reference to FIG. 15, the vibration generator 210 may include a plurality of first vibration structures 210A disposed at the first supporting region SA1 and a plurality of second vibration structures 210B disposed at the second supporting region SA2. The plurality of first vibration structures 210A may vibrate based on the first vibration driving signal to vibrate the first supporting region SA1. The plurality of second vibration structures 210B may vibrate based on the second vibration driving signal to vibrate the second supporting region SA2. For example, the vibration generator 210 may include two first vibration structures 210A and two second vibration structures 210B, but embodiments of the present disclosure are not limited thereto. For example, the vibration generator 210 may include three or more first vibration structures 210A and three or more second vibration structures 210B. For example, the first vibration driving signal may be supplied to the plurality of first vibration structures 210A in common, and the second vibration driving signal may be supplied to the plurality of second vibration structures 210B in common.

According to an embodiment of the present disclosure, the plurality of first vibration structures 210A may vibrate based on the first vibration driving signal to vibrate the left ear of the user disposed at the first supporting region SA1. For example, the plurality of first vibration structures 210A may vibrate based on the first vibration driving signal to vibrate the left ear of the user and a region near the left ear of the user, which may be disposed at the first supporting region SA1.

According to an embodiment of the present disclosure, the plurality of second vibration structures 210B may vibrate based on the second vibration driving signal to vibrate the right ear of the user disposed at the second supporting region SA2. For example, the plurality of second vibration structures 210B may vibrate based on the second vibration driving signal to vibrate the right ear of the user and a region near the right ear of the user, which may be disposed at the second supporting region SA2.

According to an embodiment of the present disclosure, the plurality of first vibration structures 210A may be arranged in a second direction (or a lengthwise direction of the headrest) Y. For example, the plurality of first vibration structures 210A may be arranged in the first direction X. For example, the plurality of first vibration structures 210A may be arranged in the first direction X and the second direction Y. For example, the plurality of second vibration structures 210B may be arranged in the second direction Y. For example, the plurality of second vibration structures 210B may be arranged in the first direction X. For example, the plurality of second vibration structures 210B may be arranged in the first direction X and the second direction Y. For example, the plurality of first vibration structures 210A and the plurality of second vibration structures 210B may be disposed to be symmetrical with respect to the center line CL, but embodiments of the present disclosure are not limited thereto.

According to an embodiment of the present disclosure, the plurality of first vibration structures 210A may be disposed on the same plane in the first supporting region SA1, but embodiments of the present disclosure are not limited thereto. For example, the plurality of second vibration structures 210B may be disposed on the same plane in the second supporting region SA2, but embodiments of the present disclosure are not limited thereto. For example, the plurality of first vibration structures 210A and the plurality of second vibration structures 210B may be disposed on the same plane in the supporting region SA, but embodiments of the present disclosure are not limited thereto.

According to an embodiment of the present disclosure, the plurality of first vibration structures 210A may be arranged or tiled in an i×j form on the same plane in the first supporting region SA1. For example, the plurality of second vibration structures 210B may be arranged or tiled in the i×j form on the same plane in the second supporting region SA2. For example, i may be the number of vibration structures disposed in the first direction X, and may be a natural number of 1 or more, and j may be the number of vibration structures disposed in the second direction Y, and may be a natural number of 2 or more, and may be equal to or different from i. For example, i may be a natural number of 2 or more, and j may be a natural number of 1 or more that is equal to or different from i. For example, all vibration structures 210A and 210B included in the vibration apparatus 200 may be arranged or tiled in the i×j form on the same plane in the supporting region SA. For example, i may be the number of vibration structures disposed in the first direction X and may be a natural number of 2 or more, and j may be the number of vibration structures disposed in the second direction Y, and may be a natural number of 2 or more that is equal to or different from i.

FIGS. 16 to 19 illustrate a headrest of a vehicle according to another embodiment of the present disclosure.

FIGS. 16 to 19 illustrate an embodiment implemented by modifying a configuration of the headrest of the vehicle illustrated in FIG. 10. Hereinafter, therefore, repeated descriptions of elements, other than a vibration apparatus and elements relevant thereto, are omitted or will be briefly given.

The vehicle according to another embodiment of the present disclosure may include the vibration-generating apparatus of FIG. 9.

With reference to FIGS. 6 and 16 to 19, the vehicle according to another embodiment of the present disclosure may include a microphone apparatus 100 and a vibration apparatus 200, which are disposed in a headrest H.

According to an embodiment of the present disclosure, the microphone apparatus 100 may include a first microphone 110 disposed in a first periphery region PA1 and a second microphone 120 disposed in a second periphery region PA2. For example, the first microphone 110 may be disposed in the first periphery region PA1, and may receive noise of the first periphery region PA1. For example, the first microphone 110 may receive noise near a left car of a user. For example, the second microphone 120 may be disposed in the second periphery region PA2, and may receive noise of the second periphery region PA2. For example, the second microphone 120 may receive noise near a right ear of the user. The first microphone 110 and the second microphone 120 may convert the received noise into an electrical signal, and may provide a noise signal to the sound processing circuit 300.

The vibration apparatus 200 may vibrate a first supporting region SA1 and a second supporting region SA2 based on the vibration driving signal from the sound processing circuit 300, and may include a plurality of vibration generators 210. For example, the vibration apparatus 200 may include a first vibration generator 210-1, disposed at the first supporting region SA1, and a second vibration generator 210-2, disposed at the second supporting region SA2. For example, the first vibration generator 210-1 may vibrate the first supporting region SA1 based on a first vibration driving signal, and the second vibration generator 210-2 may vibrate the second supporting region SA2 based on a second vibration driving signal. For example, the vibration apparatus 200 may include one or a plurality of first vibration generators 210-1 and one or a plurality of second vibration generators 210-2. For example, the first vibration generator 210-1 may include one or a plurality of first vibration structures 210A, and the second vibration generator 210-2 may include one or a plurality of second vibration structures 210B.

Figure 16:
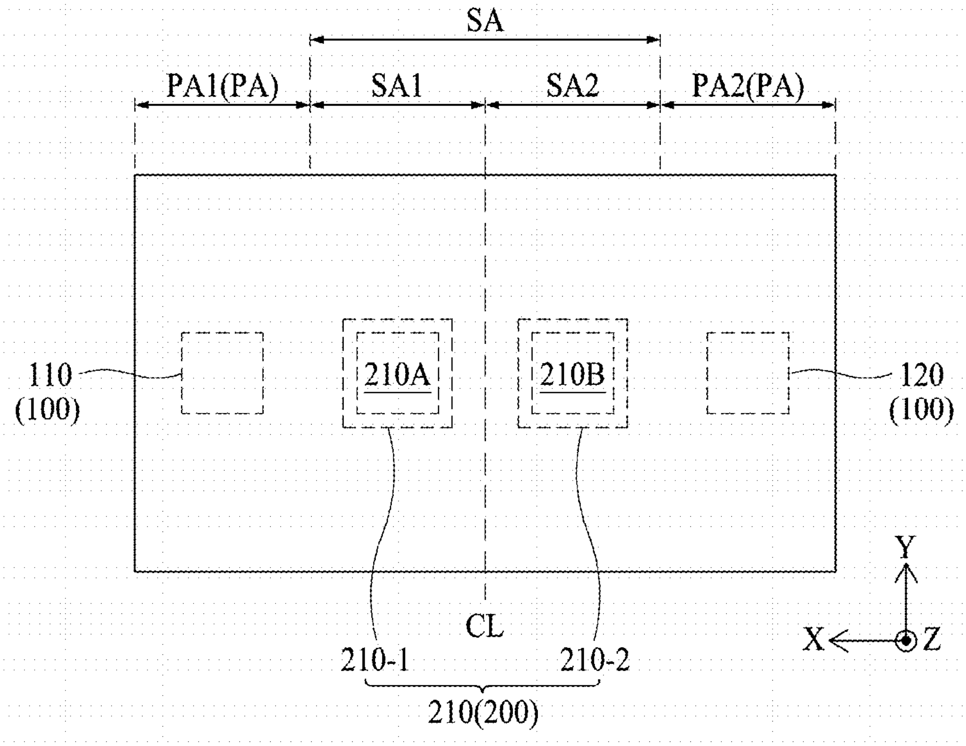
FIGS. 16 to 19 illustrate a headrest of a vehicle according to another embodiment of the present disclosure.

With reference to FIG. 16, the vibration apparatus 200 may include one first vibration generator 210-1, disposed at the first supporting region SA1, and one second vibration generator 210-2, disposed at the second supporting region SA2. The one first vibration generator 210-1 may vibrate based on the first vibration driving signal to vibrate the first supporting region SA1. The one second vibration generator 210-2 may vibrate based on the second vibration driving signal to vibrate the second supporting region SA2. The one first vibration generator 210-1 may include one first vibration structure 210A disposed at the first supporting region SA1, and the one second vibration generator 210-2 may include one second vibration structure 210B disposed at the second supporting region SA2.

According to an embodiment of the present disclosure, the one first vibration structure 210A may vibrate based on the first vibration driving signal to vibrate the first supporting region SA1. For example, the one first vibration structure 210A may vibrate a left ear of a user disposed at the first supporting region SA1. For example, the one first vibration structure 210A may vibrate the left ear of the user and a region near the left ear of the user, which may be disposed at the first supporting region SA1.

According to an embodiment of the present disclosure, the one second vibration structure 210B may vibrate based on the second vibration driving signal to vibrate the second supporting region SA2. For example, the one second vibration structure 210B may vibrate a right ear of the user disposed at the second supporting region SA2. For example, the one second vibration structure 210B may vibrate the right ear of the user and a region near the right ear of the user, which may be disposed at the second supporting region SA2.

According to an embodiment of the present disclosure, the one first vibration generator 210-1 and the one second vibration generator 210-2 may be disposed to be symmetrical with respect to a center line CL, but embodiments of the present disclosure are not limited thereto. For example, the one first vibration generator 210-1 and the one second vibration generator 210-2 may be disposed in parallel in a first direction X, but embodiments of the present disclosure are not limited thereto. For example, the one first vibration generator 210-1 and the one second vibration generator 210-2 may be disposed on the same plane in a supporting region SA, but embodiments of the present disclosure are not limited thereto.

According to an embodiment of the present disclosure, the one first vibration structure 210A and the one second vibration structure 210B may be disposed to be symmetrical with respect to the center line CL, but embodiments of the present disclosure are not limited thereto. For example, the one first vibration structure 210A and the one second vibration structure 210B may be disposed in parallel in the first direction X, but embodiments of the present disclosure are not limited thereto. For example, the one first vibration structure 210A and the one second vibration structure 210B may be disposed on the same plane in the supporting region SA, but embodiments of the present disclosure are not limited thereto.

Figure 17:
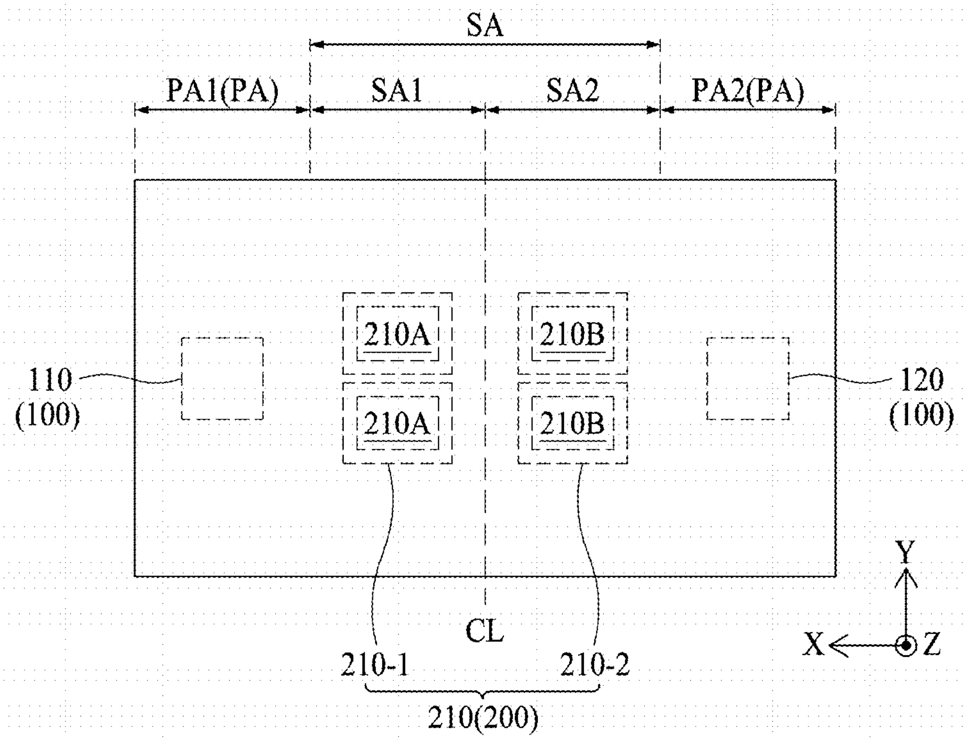

With reference to FIG. 17, the vibration apparatus 200 may include a plurality of first vibration generators 210-1, disposed at the first supporting region SA1, and a plurality of second vibration generators 210-2, disposed at the second supporting region SA2. For example, the plurality of first vibration generators 210-1 may vibrate based on the first vibration driving signal to vibrate the first supporting region SA1. The plurality of second vibration generators 210-2 may vibrate based on the second vibration driving signal to vibrate the second supporting region SA2.

According to an embodiment of the present disclosure, the vibration apparatus 200 may include two first vibration generators 210-1 and two second vibration generators 210-2, but embodiments of the present disclosure are not limited thereto. For example, the vibration apparatus 200 may include three or more first vibration generators 210-1 and three or more second vibration generators 210-2. For example, the first vibration driving signal may be supplied to the plurality of first vibration generators 210-1 in common, and the second vibration driving signal may be supplied to the plurality of second vibration generators 210-2 in common.

According to an embodiment of the present disclosure, each of the plurality of first vibration generators 210-1 may include one first vibration structure 210A, disposed at the first supporting region SA1, and each of the plurality of second vibration generators 210-2 may include one second vibration structure 210B, disposed at the second supporting region SA2. For example, the first vibration driving signal may be supplied to the first vibration structure 210A of each of the plurality of first vibration generators 210-1 in common, and the second vibration driving signal may be supplied to the second vibration structure 210B of each of the plurality of second vibration generators 210-2 in common.

According to an embodiment of the present disclosure, the first vibration structure 210A of each of the plurality of first vibration generators 210-1 may vibrate based on the first vibration driving signal to vibrate the first supporting region SA1. For example, the first vibration structure 210A of each of the plurality of first vibration generators 210-1 may vibrate a left ear of a user disposed at the first supporting region SA1. For example, the first vibration structure 210A of each of the plurality of first vibration generators 210-1 may vibrate the left ear of the user and a region near the left ear of the user, which may be disposed at the first supporting region SA1.

According to an embodiment of the present disclosure, the second vibration structure 210B of each of the plurality of second vibration generators 210-2 may vibrate based on the second vibration driving signal to vibrate the second supporting region SA2. For example, the second vibration structure 210B of each of the plurality of second vibration generators 210-2 may vibrate a right ear of the user disposed at the second supporting region SA2. For example, the second vibration structure 210B of each of the plurality of second vibration generators 210-2 may vibrate the right ear of the user and a region near the right ear of the user, which may be disposed at the second supporting region SA2.

According to an embodiment of the present disclosure, the plurality of first vibration generators 210-1 may be arranged in a second direction Y. For example, the plurality of first vibration generators 210-1 may be arranged in the first direction X. For example, the plurality of first vibration generators 210-1 may be arranged in the first direction X and the second direction Y. For example, the plurality of second vibration generators 210-2 may be arranged in the second direction Y. For example, the plurality of second vibration generators 210-2 may be arranged in the first direction X. For example, the plurality of second vibration generators 210-2 may be arranged in the first direction X and the second direction Y. For example, the plurality of first vibration generators 210-1 and the plurality of second vibration generators 210-2 may be disposed to be symmetrical with respect to the center line CL, but embodiments of the present disclosure are not limited thereto.

According to an embodiment of the present disclosure, the plurality of first vibration generators 210-1 or the plurality of first vibration structures 210A may be disposed on the same plane in the first supporting region SA1, but embodiments of the present disclosure are not limited thereto. For example, the plurality of second vibration generators 210-2 or the plurality of second vibration structures 210B may be disposed on the same plane in the second supporting region SA2, but embodiments of the present disclosure are not limited thereto. For example, the plurality of first vibration generators 210-1 and the plurality of second vibration generators 210-2 may be disposed on the same plane in a supporting region SA, but embodiments of the present disclosure are not limited thereto. For example, the plurality of first vibration structures 210A and the plurality of second vibration structures 210B may be disposed on the same plane in the supporting region SA, but embodiments of the present disclosure are not limited thereto.

According to an embodiment of the present disclosure, the plurality of first vibration generators 210-1 may be arranged or tiled in an i×j form on the same plane in the first supporting region SA1. For example, the plurality of second vibration generators 210-2 may be arranged or tiled in the i×j form on the same plane in the second supporting region SA2. For example, i may be the number of vibration generators disposed in the first direction X, and may be a natural number of 1 or more, and j may be the number of vibration generators disposed in the second direction Y, and may be a natural number of 2 or more that is equal to or different from i. For example, i may be a natural number of 2 or more, and j may be a natural number of 1 or more that is equal to or different from i. For example, all vibration generators 210-1 and 210-2 included in the vibration apparatus 200 may be arranged or tiled in the i×j form on the same plane in the supporting region SA. For example, i may be the number of vibration generators disposed in the first direction X and may be a natural number of 2 or more, and j may be the number of vibration generators disposed in the second direction Y, and may be a natural number of 2 or more that is equal to or different from i.

Figure 18:
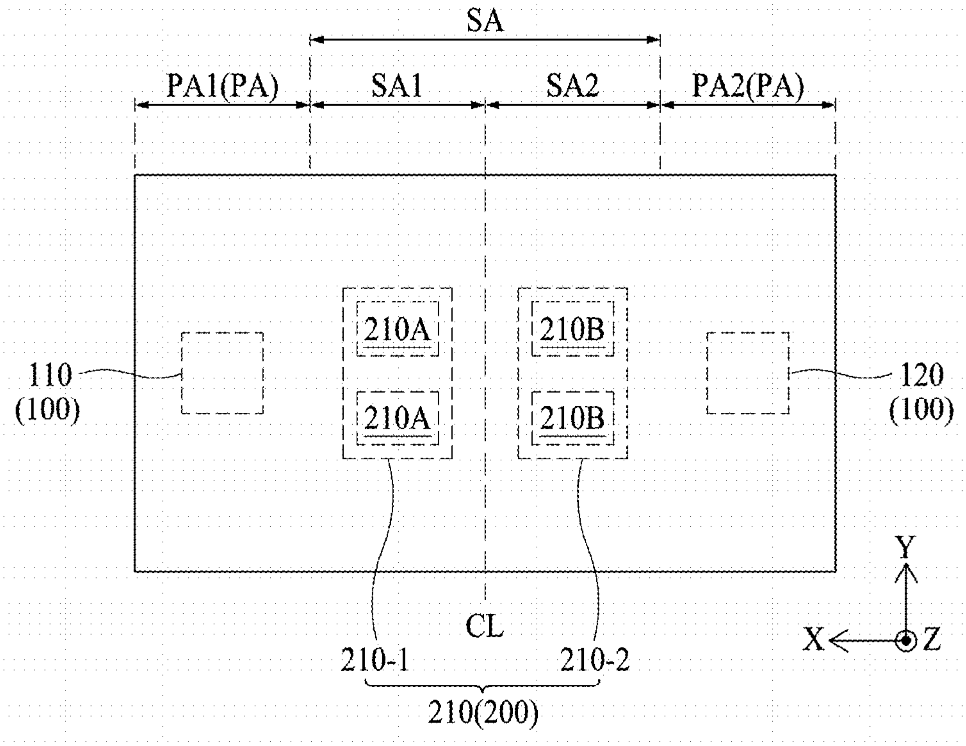

With reference to FIG. 18, the vibration apparatus 200 may include one first vibration generator 210-1, disposed at the first supporting region SA1, and one second vibration generator 210-2, disposed at the second supporting region SA2. For example, the one first vibration generator 210-1 may vibrate based on the first vibration driving signal to vibrate the first supporting region SA1. For example, the one second vibration generator 210-2 may vibrate based on the second vibration driving signal to vibrate the second supporting region SA2.

According to an embodiment of the present disclosure, the one first vibration generator 210-1 may include a plurality of first vibration structures 210A, disposed at the first supporting region SA1, and the one second vibration generator 210-2 may include a plurality of second vibration structures 210B, disposed at the second supporting region SA2. For example, the one first vibration generator 210-1 may include two first vibration structures 210A and the one second vibration generator 210-2 may include two second vibration structures 210B, but the present disclosure is not limited thereto. For example, the one first vibration generator 210-1 may include three or more first vibration structures 210A and the one second vibration generator 210-2 may include three or more second vibration structures 210B. For example, the first vibration driving signal may be supplied to the plurality of first vibration structures 210A in common, and the second vibration driving signal may be supplied to the plurality of second vibration structures 210B in common.

According to an embodiment of the present disclosure, each of the plurality of first vibration structures 210A may vibrate based on the first vibration driving signal to vibrate the first supporting region SA1. For example, each of the plurality of first vibration structures 210A may vibrate a left ear of a user disposed at the first supporting region SA1. For example, each of the plurality of first vibration structures 210A may vibrate the left ear of the user and a region near the left ear of the user, which may be disposed at the first supporting region SA1.

According to an embodiment of the present disclosure, each of the plurality of second vibration structures 210B may vibrate based on the second vibration driving signal to vibrate the second supporting region SA2. For example, each of the plurality of second vibration structures 210B may vibrate a right ear of the user disposed at the second supporting region SA2. For example, each of the plurality of second vibration structures 210B may vibrate the right ear of the user and a region near the right ear of the user, which may be disposed at the second supporting region SA2.

According to an embodiment of the present disclosure, the plurality of first vibration structures 210A may be arranged in the second direction Y. For example, the plurality of first vibration structures 210A may be arranged in the first direction X. For example, the plurality of first vibration structures 210A may be arranged in the first direction X and the second direction Y. For example, the plurality of second vibration structures 210B may be arranged in the second direction Y. For example, the plurality of second vibration structures 210B may be arranged in the first direction X. For example, the plurality of second vibration structures 210B may be arranged in the first direction X and the second direction Y.

According to an embodiment of the present disclosure, the one first vibration generator 210-1 and the one second vibration generator 210-2 may be disposed to be symmetrical with respect to the center line CL, but embodiments of the present disclosure are not limited thereto. For example, the plurality of first vibration structures 210A may be disposed on the same plane in the first supporting region SA1, but embodiments of the present disclosure are not limited thereto. For example, the plurality of second vibration structures 210B may be disposed on the same plane in the second supporting region SA2, but embodiments of the present disclosure are not limited thereto. For example, the plurality of first vibration structures 210A and the plurality of second vibration structures 210B may be disposed on the same plane in the supporting region SA, but embodiments of the present disclosure are not limited thereto.

According to an embodiment of the present disclosure, the plurality of first vibration structures 210A may be arranged or tiled in an i×j form on the same plane in the first supporting region SA1. For example, the plurality of second vibration structures 210B may be arranged or tiled in the i×j form on the same plane in the second supporting region SA2. For example, i may be the number of vibration structures disposed in the first direction X, and may be a natural number of 1 or more, and j may be the number of vibration structures disposed in the second direction Y, and may be a natural number of 2 or more that is equal to or different from i. For example, i may be a natural number of 2 or more, and j may be a natural number of 1 or more that is equal to or different from i. For example, all vibration structures 210A and 210B included in the vibration apparatus 200 may be arranged or tiled in the i×j form on the same plane in the supporting region SA. For example, i may be the number of vibration structures disposed in the first direction X, and may be a natural number of 2 or more, and j may be the number of vibration structures disposed in the second direction Y, and may be a natural number of 2 or more that is equal to or different from i.

Figure 19:
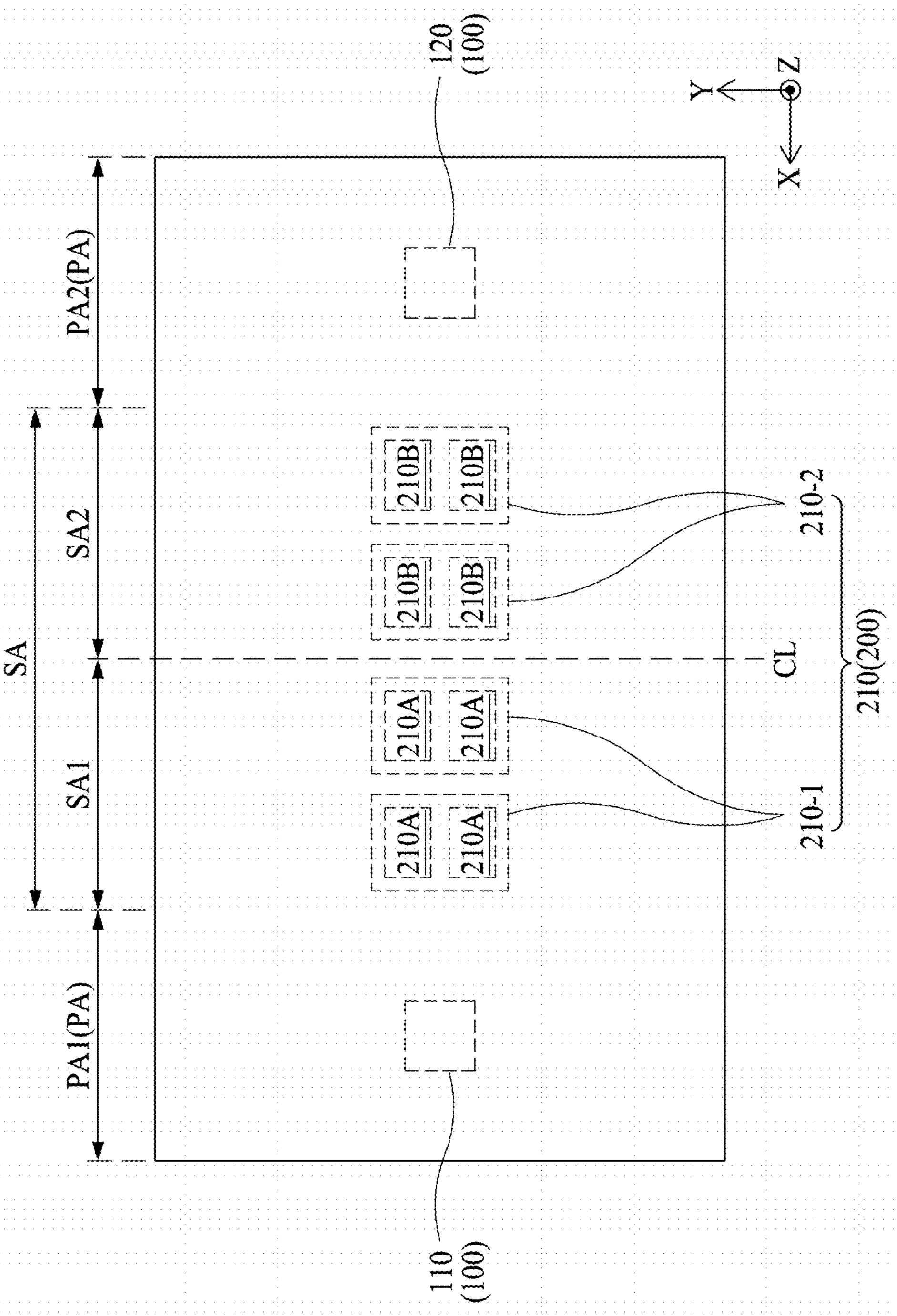

With reference to FIG. 19, the vibration apparatus 200 may include a plurality of first vibration generators 210-1, disposed at the first supporting region SA1, and a plurality of second vibration generators 210-2, disposed at the second supporting region SA2. For example, the plurality of first vibration generators 210-1 may vibrate based on the first vibration driving signal to vibrate the first supporting region SA1. For example, the plurality of second vibration generators 210-2 may vibrate based on the second vibration driving signal to vibrate the second supporting region SA2.

According to an embodiment of the present disclosure, the vibration apparatus 200 may include two first vibration generators 210-1 and two second vibration generators 210-2, but embodiments of the present disclosure are not limited thereto. For example, the vibration apparatus 200 may include three or more first vibration generators 210-1 and three or more second vibration generators 210-2. For example, the first vibration driving signal may be supplied to the plurality of first vibration generators 210-1 in common, and the second vibration driving signal may be supplied to the plurality of second vibration generators 210-2 in common.

According to an embodiment of the present disclosure, each of the plurality of first vibration generators 210-1 may include a plurality of first vibration structures 210A disposed at the first supporting region SA1, and each of the plurality of second vibration generators 210-2 may include a plurality of second vibration structure 210B disposed at the second supporting region SA2. For example, each of the plurality of first vibration generators 210-1 may include two first vibration structures 210A, and each of the plurality of second vibration generators 210-2 may include two second vibration structures 210B, but the present disclosure is not limited thereto. For example, each of the plurality of first vibration generators 210-1 may include three or more first vibration structures 210A. For example, each of the plurality of second vibration generators 210-2 may include three or more second vibration structures 210B. For example, the first vibration driving signal may be supplied to the plurality of first vibration structures 210A of each of the plurality of first vibration generators 210-1 in common, and the second vibration driving signal may be supplied to the plurality of second vibration structures 210B of each of the plurality of second vibration generators 210-2 in common.

According to an embodiment of the present disclosure, each of the plurality of first vibration structures 210A of each of the plurality of first vibration generators 210-1 may vibrate based on the first vibration driving signal to vibrate the first supporting region SA1. For example, each of the plurality of first vibration structures 210A of each of the plurality of first vibration generators 210-1 may vibrate a left ear of a user disposed at the first supporting region SA1. For example, each of the plurality of first vibration structures 210A of each of the plurality of first vibration generators 210-1 may vibrate the left ear of the user and a region near the left car of the user, which may be disposed at the first supporting region SA1.

According to an embodiment of the present disclosure, each of the plurality of second vibration structures 210B of each of the plurality of second vibration generators 210-2 may vibrate based on the second vibration driving signal to vibrate the second supporting region SA2. For example, each of the plurality of second vibration structures 210B of each of the plurality of second vibration generators 210-2 may vibrate a right ear of the user disposed at the second supporting region SA2. For example, each of the plurality of second vibration structures 210B of each of the plurality of second vibration generators 210-2 may vibrate the right ear of the user and a region near the right ear of the user, which may be disposed at the second supporting region SA2.

According to an embodiment of the present disclosure, the plurality of first vibration generators 210-1 may be arranged in a second direction Y. For example, the plurality of first vibration generators 210-1 may be arranged in the first direction X. For example, the plurality of first vibration generators 210-1 may be arranged in the first direction X and the second direction Y. For example, the plurality of second vibration generators 210-2 may be arranged in the second direction Y. For example, the plurality of second vibration generators 210-2 may be arranged in the first direction X. For example, the plurality of second vibration generators 210-2 may be arranged in the first direction X and the second direction Y. For example, the plurality of first vibration generators 210-1 and the plurality of second vibration generators 210-2 may be disposed to be symmetrical with respect to a center line CL, but embodiments of the present disclosure are not limited thereto.

According to an embodiment of the present disclosure, the plurality of first vibration generators 210-1 may be disposed on the same plane in the first supporting region SA1, but embodiments of the present disclosure are not limited thereto. For example, the plurality of second vibration generators 210-2 may be disposed on the same plane in the second supporting region SA2, but embodiments of the present disclosure are not limited thereto. For example, the plurality of first vibration generators 210-1 and the plurality of second vibration generators 210-2 may be disposed on the same plane in a supporting region SA, but embodiments of the present disclosure are not limited thereto.

According to an embodiment of the present disclosure, the plurality of first vibration generators 210-1 may be arranged or tiled in an i×j form on the same plane in the first supporting region SA1. For example, the plurality of second vibration generators 210-2 may be arranged or tiled in the i×j form on the same plane in the second supporting region SA2. For example, i may be the number of vibration generators disposed in the first direction X, and may be a natural number of 1 or more, and j may be the number of vibration generators disposed in the second direction Y, and may be a natural number of 2 or more that is equal to or different from i. For example, i may be a natural number of 2 or more, and j may be a natural number of 1 or more that is equal to or different from i. For example, all vibration generators 210-1 and 210-2 included in the vibration apparatus 200 may be arranged or tiled in the i×j form on the same plane in the supporting region SA. For example, i may be the number of vibration generators disposed in the first direction X, and may be a natural number of 4 or more, and j may be the number of vibration generators disposed in the second direction Y, and may be a natural number of 1 or more that is equal to or different from i.

According to an embodiment of the present disclosure, the plurality of first vibration structures 210A of each of the plurality of first vibration generators 210-1 may be arranged in the second direction Y. For example, the plurality of first vibration structures 210A of each of the plurality of first vibration generators 210-1 may be arranged in the first direction X. For example, the plurality of first vibration structures 210A of each of the plurality of first vibration generators 210-1 may be arranged in the first direction X and the second direction Y. For example, the plurality of second vibration structures 210B of each of the plurality of second vibration generators 210-2 may be arranged in the second direction Y. For example, the plurality of second vibration structures 210B of each of the plurality of second vibration generators 210-2 may be arranged in the first direction X. For example, the plurality of second vibration structures 210B of each of the plurality of second vibration generators 210-2 may be arranged in the first direction X and the second direction Y.

According to an embodiment of the present disclosure, the plurality of first vibration structures 210A of each of the plurality of first vibration generators 210-1 may be disposed on the same plane in the first supporting region SA1, but embodiments of the present disclosure are not limited thereto. For example, the plurality of second vibration structures 210B of each of the plurality of second vibration generators 210-2 may be disposed on the same plane in the second supporting region SA2, but embodiments of the present disclosure are not limited thereto. For example, the plurality of first vibration structures 210A of each of the plurality of first vibration generators 210-1 and the plurality of second vibration structures 210B of each of the plurality of second vibration generators 210-2 may be disposed on the same plane in a supporting region SA, but embodiments of the present disclosure are not limited thereto.

According to an embodiment of the present disclosure, the plurality of first vibration structures 210A may be arranged or tiled in an i×j form on the same plane in the first supporting region SA1. For example, the plurality of second vibration structures 210B may be arranged or tiled in the i×j form on the same plane in the second supporting region SA2. For example, i may be the number of vibration generators disposed in the first direction X, and may be a natural number of 1 or more, and j may be the number of vibration generators disposed in the second direction Y, and may be a natural number of 2 or more that is equal to or different from i. For example, i may be a natural number of 2 or more, and j may be a natural number of 1 or more that is equal to or different from i. For example, all vibration structures 210A and 210B included in the vibration apparatus 200 may be arranged or tiled in the i×j form on the same plane in the supporting region SA. For example, i may be the number of vibration generators disposed in the first direction X, and may be a natural number of 4 or more, and j may be the number of vibration generators disposed in the second direction Y, and may be a natural number of 2 or more that is equal to or different from i.

A vibration-generating apparatus and a vehicle including the same according to an embodiment of the present disclosure will be described below.

A vibration-generating apparatus according to an embodiment of the present disclosure may include a microphone apparatus disposed at an object including a plurality of regions. the microphone apparatus being configured to receive noise near the object, a sound processing circuit configured to receive a sound source signal and a noise signal corresponding to the noise, generate a noise removal signal having an antiphase of the noise signal, and generate a vibration driving signal based on the sound source signal and the noise removal signal, and a vibration apparatus disposed at the object to vibrate based on the vibration driving signal to vibrate the object.

According to some embodiments of the present disclosure, the object may be configured to vibrate to generate sound corresponding to the sound source signal.

According to some embodiments of the present disclosure, the generated sound may be provided to a user through bone conduction.

According to some embodiments of the present disclosure, the sound processing circuit may comprise an input configured to receive the sound source signal and the noise signal, a signal processor configured to receive the noise signal and generate the noise removal signal based on the noise signal, and a driving signal generating part configured to generate the vibration driving signal based on the sound source signal and the noise removal signal.

According to some embodiments of the present disclosure, the microphone apparatus may be further configured to receive first noise near a first region of the plurality of regions and second noise near a second region of the plurality of regions, and/or the sound processing circuit may be further configured to generate a first noise removal signal having an antiphase of a first noise signal corresponding to the first noise and a second noise removal signal having an antiphase of a second noise signal corresponding to the second noise.

According to some embodiments of the present disclosure, the sound processing circuit may be further configured to combine the sound source signal, the first noise removal signal, and the second noise removal signal to generate the vibration driving signal.

According to some embodiments of the present disclosure, the sound processing circuit may be further configured to combine the sound source signal with the first noise removal signal to a first vibration driving signal and combine the sound source signal with the second noise removal signal to generate a second vibration driving signal.

According to some embodiments of the present disclosure, the vibration apparatus may comprise one vibration generator disposed over a third region of the plurality of regions or a fourth region of the plurality of regions, or over the third region and the fourth region, and the sound processing circuit may be further configured to supply the vibration driving signal to the one vibration generator.

According to some embodiments of the present disclosure, the one vibration generator may comprise one or more vibration structures, and the one or more vibration structures may be configured to be disposed over the third region, the fourth region, or the third region and the fourth region.

According to some embodiments of the present disclosure, the one vibration generator may comprise a first portion including an inorganic material and a second portion including an organic material disposed between adjacent first portions.

According to some embodiments of the present disclosure, the first portion and the second portion may be alternatively arranged in a first direction and/or a second direction crossing the first direction.

According to some embodiments of the present disclosure, a width of the second portion progressively may decrease in a direction from a center portion to both sides of the vibration apparatus According to some embodiments of the present disclosure, the first portion may have a shape of a line shape, a tetragonal shape, a circular shape or a triangular shape.

According to some embodiments of the present disclosure, the one vibration generator may comprise one or more vibration structures, and/or the one or more vibration structures may comprise one or more first vibration structures disposed at the third region and one or more second vibration structures disposed at the fourth region.

According to some embodiments of the present disclosure, each of the one or more first vibration structures and the one or more second vibration structures may comprise a first portion including an inorganic material and a second portion including an organic material disposed between adjacent first portions.

According to some embodiments of the present disclosure, the vibration apparatus may comprise one or more first vibration generators disposed at a third region of the plurality of regions and one or more second vibration generators disposed at a fourth region of the plurality of regions, and the sound processing circuit may be further configured to supply the first vibration driving signal to the one or more first vibration generators and supply the second vibration driving signal to the one or more second vibration generators.

According to some embodiments of the present disclosure, the one or more first vibration generators may comprise one or more first vibration structures, and the one or more second vibration generators may comprise one or more second vibration structures.

According to some embodiments of the present disclosure, the one or more first vibration structures may comprise a first portion including an inorganic material and a second portion including an organic material disposed between adjacent first portions, and the one or more second vibration structures may comprise a first portion including an inorganic material and a second portion including an organic material disposed between adjacent first portions.

According to some embodiments of the present disclosure, the object may comprise one or more of: a seat of a vehicle, a seat of a train, a massage chair, a desk chair, and a head protection equipment.

A vibration-generating apparatus according to some embodiments of the present disclosure may comprise a microphone apparatus disposed at an object including a first region, a second region, a third region, and a fourth region, the microphone apparatus being configured to receive noise near the object; a sound processing circuit configured to receive a sound source signal and a noise signal corresponding to the noise, generate a noise removal signal having an antiphase of the noise signal, and generate a vibration driving signal based on the sound source signal and the noise removal signal; and one or more vibration generators configured to vibrate based on the vibration driving signal to vibrate one or more of the third region and the fourth region.

According to some embodiments of the present disclosure, one or more of the third region and the fourth region may be configured to vibrate to generate a sound corresponding to the sound source signal.

According to some embodiments of the present disclosure, wherein the generated sound may be provided to a user through bone conduction.

According to some embodiments of the present disclosure, the sound processing circuit may comprise an input configured to receive the sound source signal and the noise signal, a signal processor configured to receive the noise signal and generate the noise removal signal based on the noise signal, and a driving signal generating part configured to generate the vibration driving signal based on the sound source signal and the noise removal signal.

According to some embodiments of the present disclosure, the one or more vibration generators may comprise one or more first vibration structures.

According to some embodiments of the present disclosure, the one or more vibration generators may comprise one vibration generator disposed over the third region, the fourth region, or the third region and the fourth region, and the sound processing circuit may be further configured to supply the vibration driving signal to the one vibration generator.

According to some embodiments of the present disclosure, the sound processing circuit may be further configured to supply the vibration driving signal based on the sound source signal, a first noise removal signal having an antiphase of first noise near the first region, and a second noise removal signal having an antiphase of second noise near the second region.

According to some embodiments of the present disclosure, the one vibration generator may comprise one vibration structure disposed over the third region, the fourth region, or the third region and the fourth region.

According to some embodiments of the present disclosure, the one vibration generator may comprise one or more first vibration structures disposed at the third region and one or more second vibration structures disposed at the fourth region.

According to some embodiments of the present disclosure, the one or more vibration generators may comprise one or more first vibration generators disposed at the third region and one or more second vibration generators disposed at the fourth region, and the sound processing circuit may be further configured to supply the first vibration driving signal to the one or more first vibration generators and supply the second vibration driving signal to the one or more second vibration generators.

According to some embodiments of the present disclosure, the sound processing circuit may be further configured to supply the first vibration driving signal based on the sound source signal and a first noise removal signal having an antiphase of first noise near the first region and supply the second vibration driving signal based on the sound source signal and a second noise removal signal having an antiphase of second noise near the second region.

According to some embodiments of the present disclosure, the one or more first vibration generators may comprise one or more first vibration structures, and the one or more second vibration generators may comprise one or more second vibration structures.

According to some embodiments of the present disclosure, the one or more first vibration structures may comprise a first portion including an inorganic material and a second portion including an organic material disposed between adjacent first portions.

According to some embodiments of the present disclosure, the first portion and the second portion may be alternatively arranged in a first direction and/or a second direction crossing the first direction.

According to some embodiments of the present disclosure, a width of the second portion progressively may decrease in a direction from a center portion to both sides of the vibration apparatus According to some embodiments of the present disclosure, the first portion may have a shape of a line shape, a tetragonal shape, a circular shape or a triangular shape.

According to some embodiments of the present disclosure, the first portion may have a piezoelectric characteristic, and the second portion may have a ductile characteristic.

According to some embodiments of the present disclosure, the object may comprise one or more of: a seat of a vehicle, a seat of a train, a massage chair, a desk chair, and a head protection equipment.

A vehicle according to some embodiments of the present disclosure may comprise a seat including a headrest including a plurality of regions; and a vibration-generating apparatus disposed at the headrest, the vibration-generating apparatus may comprise a microphone apparatus configured to receive noise near the headrest; a sound processing circuit configured to receive a sound source signal and a noise signal corresponding to the noise, generate a noise removal signal having an antiphase of the noise signal, and generate a vibration driving signal based on the sound source signal and the noise removal signal; and a vibration apparatus configured to vibrate based on the vibration driving signal to vibrate the headrest.

According to some embodiments of the present disclosure, the plurality of regions may comprise a first supporting region, which is a left region of a center region of the headrest, a second supporting region, which is a right region of the center region of the headrest, a first periphery region disposed at a left side of the first supporting region, and a second periphery region disposed at a right side of the second supporting region.

According to some embodiments of the present disclosure, the vibration apparatus may be configured to vibrate based on the vibration driving signal to vibrate one or more of the first supporting region and the second supporting region.

According to some embodiments of the present disclosure, the seat may further include a back and a saddle, and the sound processing circuit may be disposed in any one or more of the headrest, the back and the saddle.

A vehicle according to some embodiments of the present disclosure may comprise a seat including a headrest including first to fourth regions, and a vibration-generating apparatus disposed at the headrest, the vibration-generating apparatus may comprise a microphone apparatus disposed at the headrest, the microphone apparatus being configured to receive noise near the headrest; a sound processing circuit configured to receive a sound source signal and a noise signal corresponding to the noise, generate a noise removal signal having an antiphase of the noise signal, and generate a vibration driving signal based on the sound source signal and the noise removal signal; and one or more vibration generators configured to vibrate based on the vibration driving signal to vibrate one or more of the third region and the fourth region.

According to some embodiments of the present disclosure, the first region may be a left periphery of the headrest, the second region may be a right periphery of the headrest, the third region may be a left center region of the headrest; and the fourth region may be a right center region of the headrest.

According to some embodiments of the present disclosure, the seat may further include a back and a saddle, and the sound processing circuit may be disposed in any one or more of the headrest, the back and the saddle.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A vibration generating apparatus, comprising:

a microphone apparatus disposed at an object including a plurality of regions, the microphone apparatus being configured to receive noise near the object;

a sound processing circuit configured to:

receive a sound source signal and a noise signal corresponding to the noise;

generate a noise removal signal having an antiphase of the noise signal; and generate a vibration driving signal based on the sound source signal and the noise removal signal; and a vibration apparatus disposed at the object to vibrate based on the vibration driving signal to vibrate the object, wherein the noise is offset and removed by a vibration of the vibration apparatus generated based on the noise removal signal, and a sound source generated by a vibration of the vibration apparatus based on the sound source signal is received by a user through bone conduction, and wherein the object comprises a headrest of one or more of a seat of a vehicle, a seat of a train, a massage chair, and a desk chair.

2. The vibration generating apparatus of claim 1, wherein the sound processing circuit comprises:

an input configured to receive the sound source signal and the noise signal;

a signal processor configured to:

receive the noise signal; and generate the noise removal signal based on the noise signal; and a driving signal generating part configured to generate the vibration driving signal based on the sound source signal and the noise removal signal.

3. The vibration generating apparatus of claim 1, wherein the microphone apparatus is further configured to receive:

a first noise near a first region of the plurality of regions; and a second noise near a second region of the plurality of regions, and wherein the sound processing circuit is further configured to generate:

a first noise removal signal having an antiphase of a first noise signal corresponding to the first noise; and a second noise removal signal having an antiphase of a second noise signal corresponding to the second noise.

4. The vibration generating apparatus of claim 3, wherein the sound processing circuit is further configured to combine the sound source signal, the first noise removal signal, and the second noise removal signal to generate the vibration driving signal.

5. The vibration generating apparatus of claim 4,
wherein the vibration apparatus comprises one vibration generator disposed over a third region of the plurality of regions or a fourth region of the plurality of regions, or over the third region and the fourth region of the plurality of regions, and
wherein the sound processing circuit is further configured to supply the vibration driving signal to the one vibration generator.

6. The vibration generating apparatus of claim 5,
wherein the one vibration generator comprises one or more vibration structures, and
wherein the one or more vibration structures are disposed over the third region, the fourth region, or the third region and the fourth region.

7. The vibration generating apparatus of claim 6, wherein the one or more vibration structures comprise a vibration portion including a piezoelectric material.

8. The vibration generating apparatus of claim 6, wherein the one or more vibration structures comprise a first portion including an inorganic material and a second portion including an organic material disposed between adjacent first portions.

9. The vibration generating apparatus of claim 5,
wherein the one vibration generator comprises one or more vibration structures, and/or
wherein the one or more vibration structures comprise one or more first vibration structures disposed at the third region and one or more second vibration structures disposed at the fourth region.

10. The vibration generating apparatus of claim 9, wherein each of the one or more first vibration structures and the one or more second vibration structures comprises a first portion including an inorganic material and a second portion including an organic material disposed between adjacent first portions.

11. The vibration generating apparatus of claim 3, wherein the sound processing circuit is further configured to:
combine the sound source signal with the first noise removal signal to generate a first vibration driving signal; and
combine the sound source signal with the second noise removal signal to generate a second vibration driving signal.

12. The vibration generating apparatus of claim 11,
wherein the vibration apparatus comprises one or more first vibration generators disposed at a third region of the plurality of regions and one or more second vibration generators disposed at a fourth region of the plurality of regions, and
wherein the sound processing circuit is further configured to supply the first vibration driving signal to the one or more first vibration generators and to supply the second vibration driving signal to the one or more second vibration generators.

13. The vibration generating apparatus of claim 12,
wherein the one or more first vibration generators comprise one or more first vibration structures, and
wherein the one or more second vibration generators comprise one or more second vibration structures.

14. The vibration generating apparatus of claim 13, wherein each of the one or more first vibration structures and the one or more second vibration structures comprises a vibration portion including a piezoelectric material.

15. The vibration generating apparatus of claim 13,
wherein the one or more first vibration structures comprise a first portion including an inorganic material and a second portion including an organic material disposed between adjacent first portions, and
wherein the one or more second vibration structures comprise a first portion including an inorganic material and a second portion including an organic material disposed between adjacent first portions.

16. A vehicle, comprising:
a seat including a headrest including a plurality of regions; and
a vibration generating apparatus disposed at the headrest,
wherein the vibration generating apparatus comprises the vibration generating apparatus of claim 1, and
wherein the headrest is the object of the vibration generating apparatus.

17. The vehicle of claim 16, wherein the plurality of regions comprise:
a first supporting region, which is a left region of a center region of the headrest;
a second supporting region, which is a right region of the center region of the headrest;
a first periphery region disposed at a left side of the first supporting region; and
a second periphery region disposed at a right side of the second supporting region.

18. The vehicle of claim 17, wherein the vibration apparatus is configured to vibrate based on the vibration driving signal to vibrate one or more of the first supporting region and the second supporting region.

19. A vibration generating apparatus, comprising:
a microphone apparatus disposed at an object including a first region, a second region, a third region, and a fourth region, the microphone apparatus being configured to receive noise near the object;
a sound processing circuit configured to:
receive a sound source signal and a noise signal corresponding to the noise;
generate a noise removal signal having an antiphase of the noise signal and
generate a vibration driving signal based on the sound source signal and the noise removal signal; and
one or more vibration generators configured to vibrate based on the vibration driving signal to vibrate one or more of the third region and the fourth region,
wherein the noise is offset and removed by a vibration of the one or more vibration generators generated based on the noise removal signal, and a sound source generated by a vibration of the one or more vibration generators based on the sound source signal is received by a user through bone conduction, and
wherein the object comprises a headrest of one or more of a seat of a vehicle, a seat of a train, a massage chair, and a desk chair.

20. The vibration generating apparatus of claim 19, wherein the sound processing circuit comprises:
an input configured to receive the sound source signal and the noise signal;
a signal processor configured to:
receive the noise signal; and
generate the noise removal signal based on the noise signal; and
a driving signal generating part configured to generate the vibration driving signal based on the sound source signal and the noise removal signal.

21. The vibration generating apparatus of claim 19, wherein the one or more vibration generators comprise one or more first vibration structures.

22. The vibration generating apparatus of claim 21, wherein the one or more first vibration structures comprise a vibration portion including a piezoelectric material.

23. The vibration generating apparatus of claim 21, wherein the one or more first vibration structures comprise a first portion including an inorganic material and a second portion including an organic material disposed between adjacent first portions.

24. The vibration generating apparatus of claim 23, wherein the first portion has a piezoelectric characteristic, and wherein the second portion has a ductile characteristic.

25. The vibration generating apparatus of claim 19, wherein the one or more vibration generators comprise one vibration generator disposed over the third region, the fourth region, or the third region and the fourth region, and wherein the sound processing circuit is further configured to supply the vibration driving signal to the one vibration generator.

26. The vibration generating apparatus of claim 25, wherein the sound processing circuit is further configured to supply the vibration driving signal based on the sound source signal, a first noise removal signal having an antiphase of first noise near the first region, and a second noise removal signal having an antiphase of second noise near the second region.

27. The vibration generating apparatus of claim 25, wherein the one vibration generator comprises one vibration structure disposed over the third region, the fourth region, or the third region and the fourth region.

28. The vibration generating apparatus of claim 25, wherein the one vibration generator comprises:

one or more first vibration structures disposed at the third region, and one or more second vibration structures disposed at the fourth region.

29. The vibration generating apparatus of claim 19, wherein the one or more vibration generators comprise one or more first vibration generators disposed at the third region and one or more second vibration generators disposed at the fourth region, and wherein the sound processing circuit is further configured to supply the first vibration driving signal to the one or more first vibration generator and supply the second vibration driving signal to the one or more second vibration generators.

30. The vibration generating apparatus of claim 29, wherein the sound processing circuit is further configured to supply the first vibration driving signal based on the sound source signal and a first noise removal signal having an antiphase of first noise near the first region and supply the second vibration driving signal based on the sound source signal and a second noise removal signal having an antiphase of second noise near the second region.

31. The vibration generating apparatus of claim 29, wherein the one or more first vibration generators comprise one or more first vibration structures, and wherein the one or more second vibration generators comprise at least one second vibration structures.

32. A vehicle, comprising:

a seat including a headrest including first to fourth regions; and a vibration generating apparatus disposed at the headrest, wherein the vibration generating apparatus comprises the vibration generating apparatus of claim 19, and wherein the headrest is the object of the vibration generating apparatus.

33. The vehicle of claim 32, wherein:

the first region is a left periphery of the headrest;

the second region is a right periphery of the headrest;

the third region is a left center region of the headrest; and the fourth region is a right center region of the headrest.

* * * * *